US012809607B2

(12) United States Patent
Utsunomiya et al.

(10) Patent No.: US 12,809,607 B2
(45) Date of Patent: Nov. 24, 2026

(54) DATA COMMUNICATION SYSTEM, FUNCTION MANAGEMENT SERVER, IN-VEHICLE SYSTEM, AND NON-TRANSITORY COMPUTER READABLE STORAGE MEDIUM

(71) Applicant: DENSO CORPORATION, Kariya-city (JP)

(72) Inventors: Masato Utsunomiya, Kariya-city (JP); Masafumi Nohara, Kariya-city (JP); Kazuki Izumi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 106 days.

(21) Appl. No.: 18/658,091

(22) Filed: May 8, 2024

(65) Prior Publication Data

US 2024/0289105 A1 Aug. 29, 2024

Related U.S. Application Data

(63) Continuation of application No. PCT/JP2022/038056, filed on Oct. 12, 2022.

(30) Foreign Application Priority Data

Nov. 12, 2021 (JP) ................................ 2021-184858
Mar. 28, 2022 (JP) ................................ 2022-051758

(51) Int. Cl.

*G06F 8/61* (2018.01)
*G07C 5/00* (2006.01)
*H04L 67/12* (2022.01)

(52) U.S. Cl.

CPC ............... *G06F 8/61* (2013.01); *G07C 5/008* (2013.01); *H04L 67/12* (2013.01)

(58) Field of Classification Search

CPC ........... G06F 8/61; G07C 5/008; G01C 21/26; G01C 21/3617; G08G 1/00; G08G 1/09;
(Continued)

(56) References Cited

U.S. PATENT DOCUMENTS 10,373,523 B1 * 8/2019 Fields .................... G06Q 50/20
10,576,993 B2 * 3/2020 Yoon .................... G06V 40/168
(Continued)

FOREIGN PATENT DOCUMENTS

JP 2009036675 A 2/2009
JP 2018140766 A 9/2018
(Continued)

*Primary Examiner* — Adnan Aziz
(74) *Attorney, Agent, or Firm* — Harness, Dickey & Pierce, P.L.C.

(57) ABSTRACT

A data communication system includes: a function management server that manages a function related to a vehicle; and an in-vehicle system mounted in the vehicle. The function management server and the in-vehicle system perform data communication with each other. The function management server acquires driving data of the driver from the in-vehicle system, specifies a recommend function, and distributes the recommend function information related to the specified recommend function to the in-vehicle system. When the in-vehicle system receives the recommend function information distributed from the function management server, the in-vehicle system presents the recommend function specified by the received recommend function information to the driver.

20 Claims, 21 Drawing Sheets

(58) Field of Classification Search

CPC ............... G06Q 30/02; G06Q 30/0254; G06Q 30/0255; G06Q 30/0265; G06Q 30/0266; G06Q 30/0261; G06V 20/582; H04L 67/12; H04L 67/535; B60W 50/14; B60W 40/09

See application file for complete search history.

(56) References Cited

U.S. PATENT DOCUMENTS

| | | | | |
|---|---|---|---|---|
| 2008/0228537 | A1* | 9/2008 | Monfried | G06Q 30/02 705/14.53 |
| 2009/0164300 | A1* | 6/2009 | Gupta | G06Q 30/0275 705/14.71 |
| 2012/0239471 | A1* | 9/2012 | Grimm | G06Q 30/0265 705/14.5 |
| 2012/0284118 | A1* | 11/2012 | Mamich, Jr. | G06Q 30/0261 705/14.58 |
| 2013/0066709 | A1* | 3/2013 | Riley | G06Q 30/0254 705/14.42 |
| 2014/0108307 | A1* | 4/2014 | Raghunathan | G06N 20/00 706/12 |
| 2014/0344728 | A1* | 11/2014 | Tuukkanen | G06F 3/04817 715/763 |
| 2015/0307106 | A1* | 10/2015 | Rao | B60W 50/10 701/29.1 |
| 2017/0255966 | A1* | 9/2017 | Khoury | B60W 40/00 |
| 2018/0067486 | A1* | 3/2018 | Yako | B60W 60/0059 |
| 2018/0170256 | A1 | 6/2018 | Medenica et al. | |
| 2018/0322715 | A1* | 11/2018 | Toyoda | B60W 30/08 |
| 2019/0079659 | A1* | 3/2019 | Adenwala | G08G 1/22 |
| 2019/0080596 | A1* | 3/2019 | Suzuki | G08G 1/0962 |
| 2019/0100216 | A1* | 4/2019 | Volos | G06Q 40/08 |
| 2019/0176845 | A1* | 6/2019 | Yoon | G06V 20/59 |
| 2019/0210559 | A1 | 7/2019 | Krainer et al. | |
| 2019/0256104 | A1* | 8/2019 | Shimizu | B60W 30/182 |
| 2019/0278263 | A1* | 9/2019 | Mason | B60W 50/10 |
| 2019/0315297 | A1 | 10/2019 | Yamada et al. | |
| 2020/0378783 | A1* | 12/2020 | Neubauer | G06N 5/04 |
| 2021/0097314 | A1* | 4/2021 | Scanlon | G06V 20/584 |
| 2022/0111855 | A1* | 4/2022 | Maeda | B60W 40/09 |

FOREIGN PATENT DOCUMENTS

| | | | |
|---|---|---|---|
| JP | 2018169703 | A | 11/2018 |
| JP | 2019182231 | A | 10/2019 |
| JP | 2019212019 | A | 12/2019 |
| JP | 2022080667 | A | 5/2022 |

* cited by examiner

DATA COMMUNICATION SYSTEM, FUNCTION MANAGEMENT SERVER, IN-VEHICLE SYSTEM, AND NON-TRANSITORY COMPUTER READABLE STORAGE MEDIUM

CROSS REFERENCE TO RELATED APPLICATION

The present application is a continuation application of International Patent Application No. PCT/JP2022/038056 filed on Oct. 12, 2022, which designated the U.S. and claims the benefit of priority from Japanese Patent Applications No. 2021-184858 filed on Nov. 12, 2021 and No. 2022-051758 filed on Mar. 28, 2022. The entire disclosures of all of the above applications are incorporated herein by reference.

TECHNICAL FIELD

The present disclosure relates to a data communication system, a function management server, an in-vehicle system, and a non-transitory computer readable storage medium.

BACKGROUND

A conceivable technique teaches such that the personal setting information associated with the driver is managed on the server, and when the driver's personal authentication is completed in the in-vehicle system and the power source of the vehicle is turned on, the personal setting information of the driver whose personal authentication has been completed is obtained from the server.

SUMMARY

According to an example, a data communication system may include: a function management server that manages a function related to a vehicle; and an in-vehicle system mounted in the vehicle. The function management server and the in-vehicle system perform data communication with each other. The function management server acquires driving data of the driver from the in-vehicle system, specifies a recommend function, and distributes the recommend function information related to the specified recommend function to the in-vehicle system. When the in-vehicle system receives the recommend function information distributed from the function management server, the in-vehicle system presents the recommend function specified by the received recommend function information to the driver.

BRIEF DESCRIPTION OF THE DRAWINGS

The above-described features and advantages of the present disclosure will become more apparent from the following detailed description with reference to the accompanying drawings. In the drawings.

DETAILED DESCRIPTION

Figure 1:
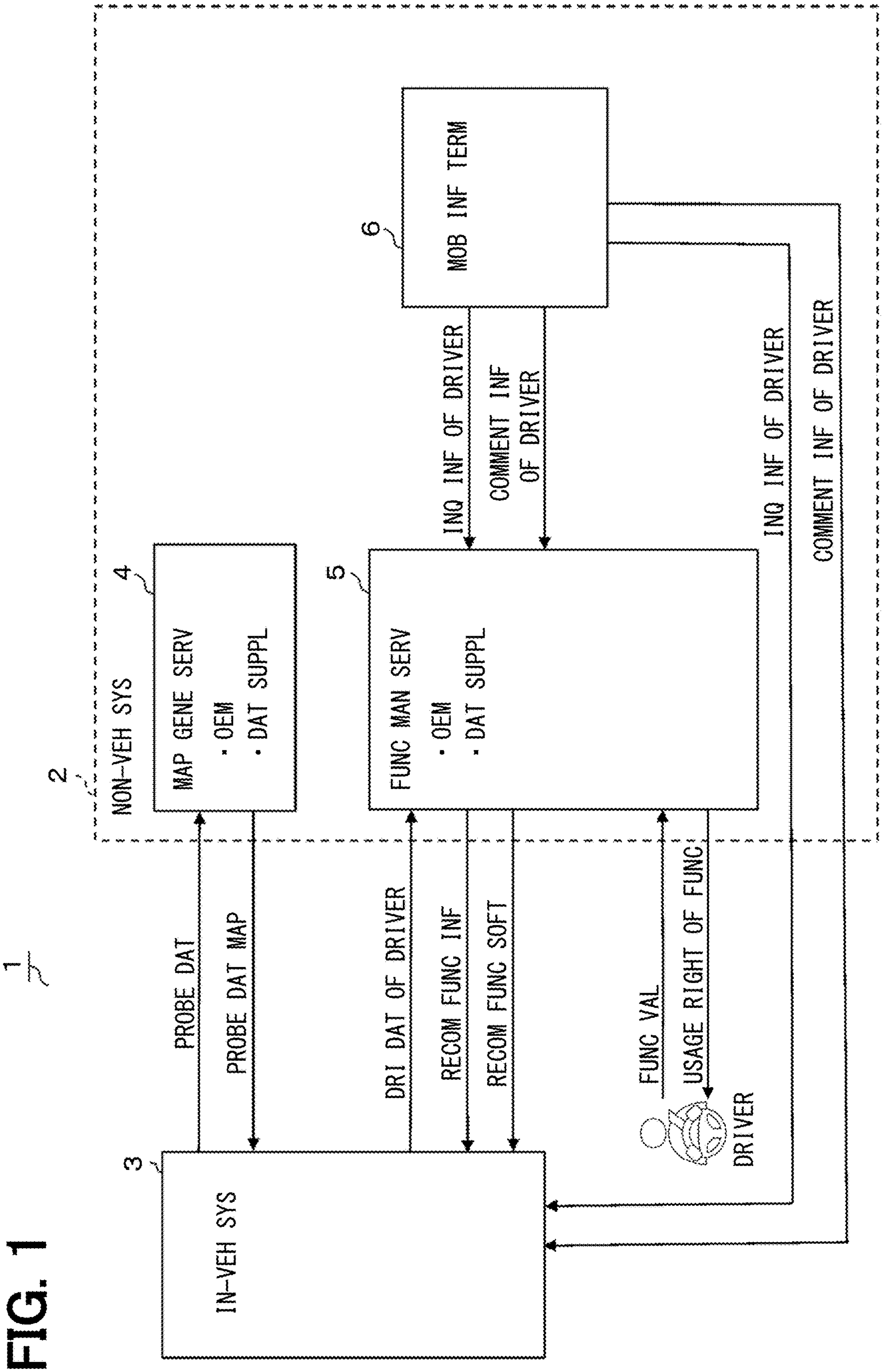
FIG. 1 is a functional block diagram showing the configuration of a data communication system according to a first embodiment.

A method according to the conceivable technique has a difficulty in that, for example, when a vehicle is replaced to a new one due to vehicle sales or the like, functions requested by the driver cannot be used. Therefore, a technique is conceivable that it is determined whether the functions installed in the vehicle on which the driver gets in correspond to the personal setting information managed by the server, and if at least some of them do not correspond to the personal setting information, the at least some of them not corresponding to are notified to the driver.

Here, there are some drivers who have the pain point of "they only use certain functions due to their particular driving style, but they really want to know and try new functions". Conventionally, it has not been possible to present functions effective for driving or functions of interest to such drivers.

The present embodiments provide to appropriately present functions effective for driving and functions of interest to the driver, thereby increasing convenience.

According to one aspect of the present embodiments, a function management server that manages a function related to a vehicle and an in-vehicle system installed in the vehicle perform data communication. The function management server acquires driving data of the driver from the in-vehicle system, specifies a recommend function, and distributes the recommend function information related to the specified recommend function to the in-vehicle system. When the in-vehicle system receives the recommend function information distributed from the function management server, the in-vehicle system presents the recommend function specified by the received recommend function information to the driver.

The function management server specifies the recommend function based on the driving data of the driver, and distributes the recommend function information related to the identified recommend function to the in-vehicle system. In the in-vehicle system, the recommend function specified by the recommend function information is presented to the driver. By setting the function that is effective for driving based on the driving data of the driver as the recommend function, the function that is effective for driving can be appropriately presented to the driver, and convenience can be improved.

According to one aspect of the present embodiments, a function management server that manages a function related to a vehicle and an in-vehicle system installed in the vehicle perform data communication. The function management server acquires inquiry information of the driver in the automatic conversation service, specifies the recommend function, and distributes the recommend function information related to the specified recommend function to the in-vehicle system. When the in-vehicle system receives the recommend function information distributed from the function management server, the in-vehicle system presents the recommend function specified by the received recommend function information to the driver.

In the function management server, the recommend function is specified based on the inquiry information of the driver in the automatic conversation service, and the recommend function information related to the specified recommend functions is distributed to the in-vehicle system. In the in-vehicle system, the recommend function specified by the recommend function information is presented to the driver. By setting an interesting function based on the inquiry information of the driver in the automatic conversation service as the recommend function, the function of interest can be appropriately presented to the driver, and the convenience can be improved.

According to one aspect of the present embodiments, a function management server that manages a function related to a vehicle and an in-vehicle system installed in the vehicle perform data communication. The function management server acquires comment information of the driver in an online communication service using a website, specifies a recommend function, and distributes recommend function information regarding the specified recommend function to the in-vehicle system. When the in-vehicle system receives the recommend function information distributed from the function management server, the in-vehicle system presents the recommend function specified by the received recommend function information to the driver.

In the function management server, a recommended function is specified based on the comment information of the driver in an online communication service using a website, and the recommend function information regarding the specified recommend function is distributed to the in-vehicle system. In the in-vehicle system, the recommend function specified by the recommend function information is presented to the driver. By setting an interesting function based on the comment information of the driver in the online communication services using the websites as the recommend function, it is possible to appropriately present the function of interest to the driver, and increases convenience.

The following will describe embodiments of the present disclosure with reference to the accompanying drawings. In the following description, descriptions of same configurations as the ones described in the preceding embodiment may be omitted for simplification.

First Embodiment

A first embodiment will be described below with reference to FIGS. 1 to 14. As shown in FIG. 1, the data communication system 1 includes a non-vehicle system 2 outside the vehicle and an in-vehicle system 3 mounted in the vehicle. The non-vehicle system 2 includes a map generation server 4, a function management server 5, and a mobile information terminal 6. The mobile information terminal 6 is, for example, a smartphone 6*a*. The map generation server 4, the function management server 5, and the mobile information terminal 6 are each capable of data communication with the in-vehicle system 3 via a communication network including, for example, a digital communication line. Furthermore, the mobile information terminal 6 is capable of data communication with the in-vehicle system 3 while being brought into the compartment of the vehicle. The in-vehicle system 3, the map generation server 4, and the function management server 5 each have a plurality-to-one relationship. That is, a plurality of in-vehicle systems 3 can be connected to one map generation server 4 for data communication, and a plurality of in-vehicle systems 3 can be connected to one function management server 5 for data communication.

The map generation server 4 is a server managed by an OEM (i.e., a vehicle manufacturer), a data supplier, and the like, and has a function of integrating a plurality of probe data to generate a probe data map. When the map generation server 4 receives and acquires the probe data transmitted from the in-vehicle system 3, it integrates the plurality of probe data to generate a probe data map. For example, each time the map generation server 4 receives and acquires the probe data transmitted from the in-vehicle system 3, the map generation server 4 updates sequentially the probe data map by sequentially reflecting the feature information included in the acquired probe data on the latest probe data map stored at that time.

When the condition for transmitting the probe data map is satisfied, the map generation server 4 transmits the latest probe data map stored at that time to the in-vehicle system 3. For example, the map generation server 4 manages the probe data map in units of segments for each section, and when the map generation server 4 receives and acquires the own vehicle position transmitted from the in-vehicle system 3, the map generation server 4 specifies the segment of the probe data map corresponding to the acquired own vehicle position, and transmits the specified probe data map via the communication network to the in-vehicle system 3, which is the transmission source of the own vehicle position.

Figure 2:
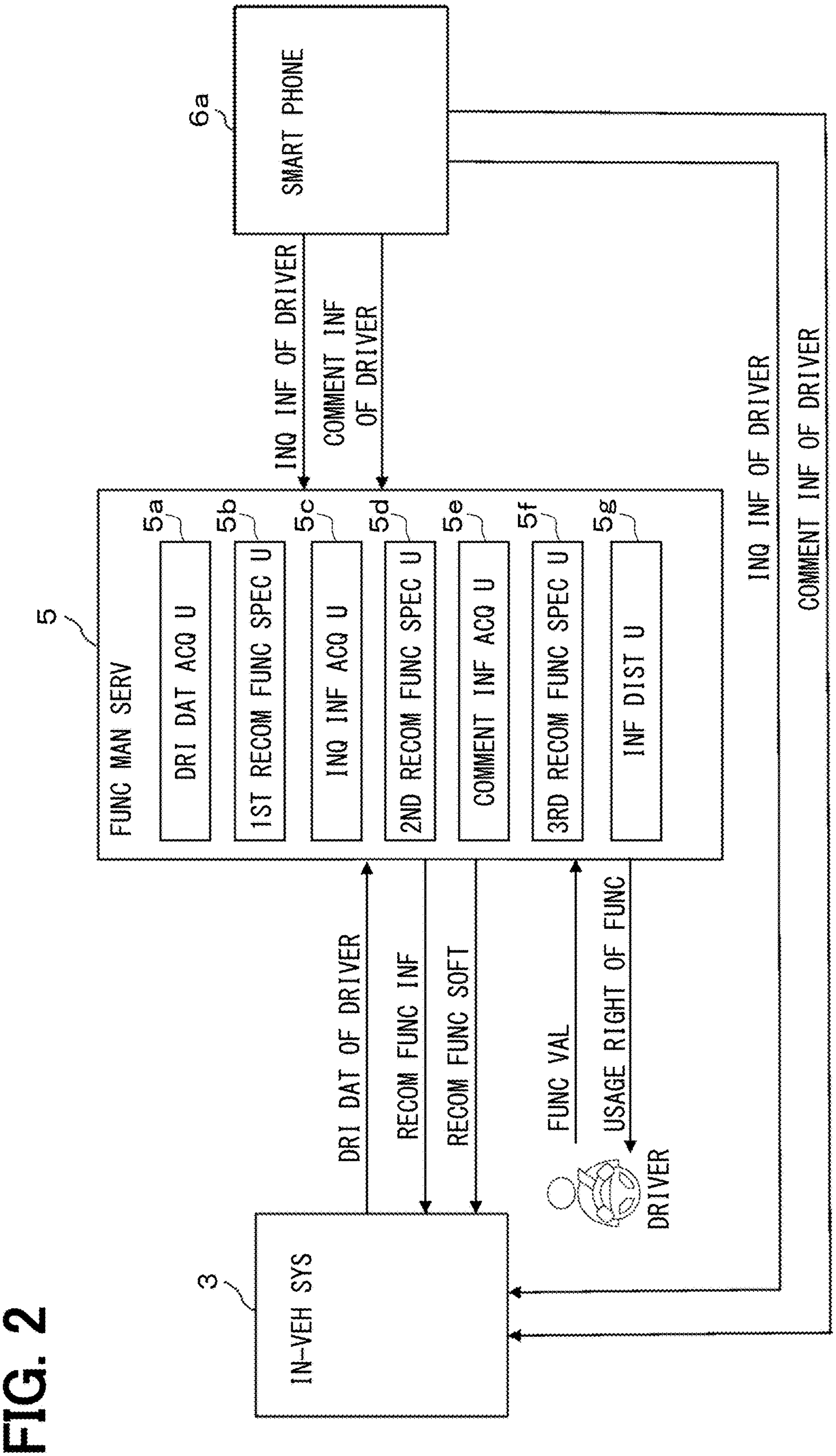
FIG. 2 is a functional block diagram showing a function management server.

The function management server 5 is a server managed by the OEM, the data supplier, and the like, and has a function of managing functions related to a vehicle. As shown in FIG. 2, the function management server 5 includes a driving data acquisition unit 5*a*, a first recommend function specifying unit 5*b*, an inquiry information acquisition unit 5*c*, a second recommend function specifying unit 5*d*, and an comment information acquisition unit 5*e*, a third recommend function specifying unit 5*f*, and an information distribution unit 5*g*. A recommend function distribution program executed by the function management server 5 is realized by each of these units 5*a* to 5*g*.

The driving data acquisition unit 5*a* receives and acquires the driving data of the driver transmitted from the in-vehicle system 3. When the driving data of the driver is acquired by the driving data acquisition unit 5*a*, the first recommend function specifying unit 5*b* specifies a recommend function based on the acquired driving data of the driver.

The first recommend function specifying unit 5*b* analyzes the driving technique of the driver from the driving data of the driver, and if the first recommend function specifying unit 5*b* determines that the technique for keeping the driving lane is unstable, the first recommend function specifying unit 5*b* determines that a lane keeping assist function (hereinafter referred to as LKA, i.e., lane keeping assist) and a lane tracing assist (hereinafter referred to as LTA, i.e., lane tracing assist), which are driving support functions, are effective for the driving operation of the driver, and specifies the LKA function and the LTA function that are determined to be effective for the driving operation, as recommend functions. In this case, the first recommend function specifying unit 5*b* may specify the recommend function by comparing the driving data of the driver acquired from the in-vehicle system 3 with the driving data of other drivers, or may specify the recommend function by comparing the driving data of the driver acquired from the in-vehicle system 3 with the driving data of other drivers at the same place. That is, the first recommend function specifying unit 5*b* may specify, for example, the prediction route of the target vehicle, and specify, as the recommend function, a function that is already used by another driver on the specified prediction route.

The inquiry information acquisition unit 5*c* has a function of monitoring the usage status of the automatic conversation service used by the driver on the mobile information terminal 6. The automatic conversation service is a cloud service for real-time communication using the Internet, for example, according to an automatic conversation program defined as a chatbot that utilizes artificial intelligence. The inquiry information acquisition unit 5*c* monitors the inquiry information regarding questions posted by the driver in the automatic conversation service, and receives and acquires the inquiry information of the driver transmitted from the mobile information terminal 6. The inquiry information acquisition unit 5*c* receives and acquires the inquiry information of the driver from the mobile information terminal 6 via the in-vehicle system 3 when the data communication with the in-vehicle system 3 is available since the mobile information terminal 6 is brought into the compartment of the vehicle. That is, the inquiry information acquisition unit 5*c* receives the inquiry information of the driver transmitted from the mobile information terminal 6 directly, and also receives the inquiry information of the driver transmitted from the mobile information terminal 6 via the in-vehicle system 3.

When the inquiry information of the driver is acquired by the inquiry information acquisition unit 5*c*, the second recommend function specifying unit 5*d* specifies a recommend function based on the acquired inquiry information of the driver. The second recommend function specifying unit 5*d* analyzes the text of the question posted by the driver, and determines that the driver is interested in the LKA or the LTA when specifying that the inquiry information of the driver includes vocabulary such as "LKA" and "LTA" or vocabulary related to the LKA and the LTA, and then, the second recommend function specifying unit 5*d* specifies the functions of LKA or LTA that are determined to be of interest to the driver, as recommend functions.

The comment information acquisition unit 5*e* has a function of monitoring the usage status of the online communication service using the websites by the mobile information terminal 6 of the driver. The online communication services using the websites are social networking services (i.e., SNS), such as Facebook, Twitter, LINE, and Instagram. The comment information acquisition unit 5*e* monitors comment information related to comments posted by the driver in an online communication service using a website, and receives and acquires the comment information of the driver transmitted from the mobile information terminal 6. The comment information acquisition unit 5*e* receives and acquires the comment information of the driver from the mobile information terminal 6 via the in-vehicle system 3 when the data communication with the in-vehicle system 3 is available since the mobile information terminal 6 is brought into the compartment of the vehicle. That is, the comment information acquisition unit 5*e* receives the comment information of the driver transmitted from the mobile information terminal 6 directly, and also receives the comment information of the driver transmitted from the mobile information terminal 6 via the in-vehicle system 3.

When the comment information of the driver is acquired by the comment information acquisition unit 5*e*, the third recommend function specifying unit 5*f* specifies a recommend function based on the comment information of the driver. The third recommend function specifying unit 5*f* analyzes the text of the comments posted by the driver, and determines that the driver is interested in the LKA or the LTA when specifying that the comment information of the driver includes vocabulary such as "LKA" and "LTA" or vocabulary related to the LKA and the LTA, and then, the third recommend function specifying unit 5*f* specifies the functions of LKA or LTA that are determined to be of interest to the driver, as recommend functions.

When a recommend function is specified by any of the first recommend function specifying unit 5*b*, second recommend function specifying unit 5*d*, or third recommend function specifying unit 5*f*, the information distribution unit 5*g* transmits recommend function information related to the specified recommend function to the in-vehicle system 3. Here, the recommend function is not limited to the LKA and the LTA, but may be any function that is effective for the driver's driving or that the driver is interested in.

When the in-vehicle system 3 receives and acquires the recommend function information transmitted from the function management server 5, the in-vehicle system 3 notifies the driver of the acquired recommend function information and presents the recommend function to the driver. Further, the information distribution unit 5*g* may transmit the recommend function information to the in-vehicle system 3 as well as to the mobile information terminal 6 of the driver. That is, the driver can recognize the recommend function specified by the function management server 5 by being presented with the recommend function by the in-vehicle system 3 in the compartment of the vehicle, and further, the recommend function is also presented by the mobile information terminal 6, so that the recommend function specified by the function management server 5 can be recognized outside the vehicle.

Figure 3:
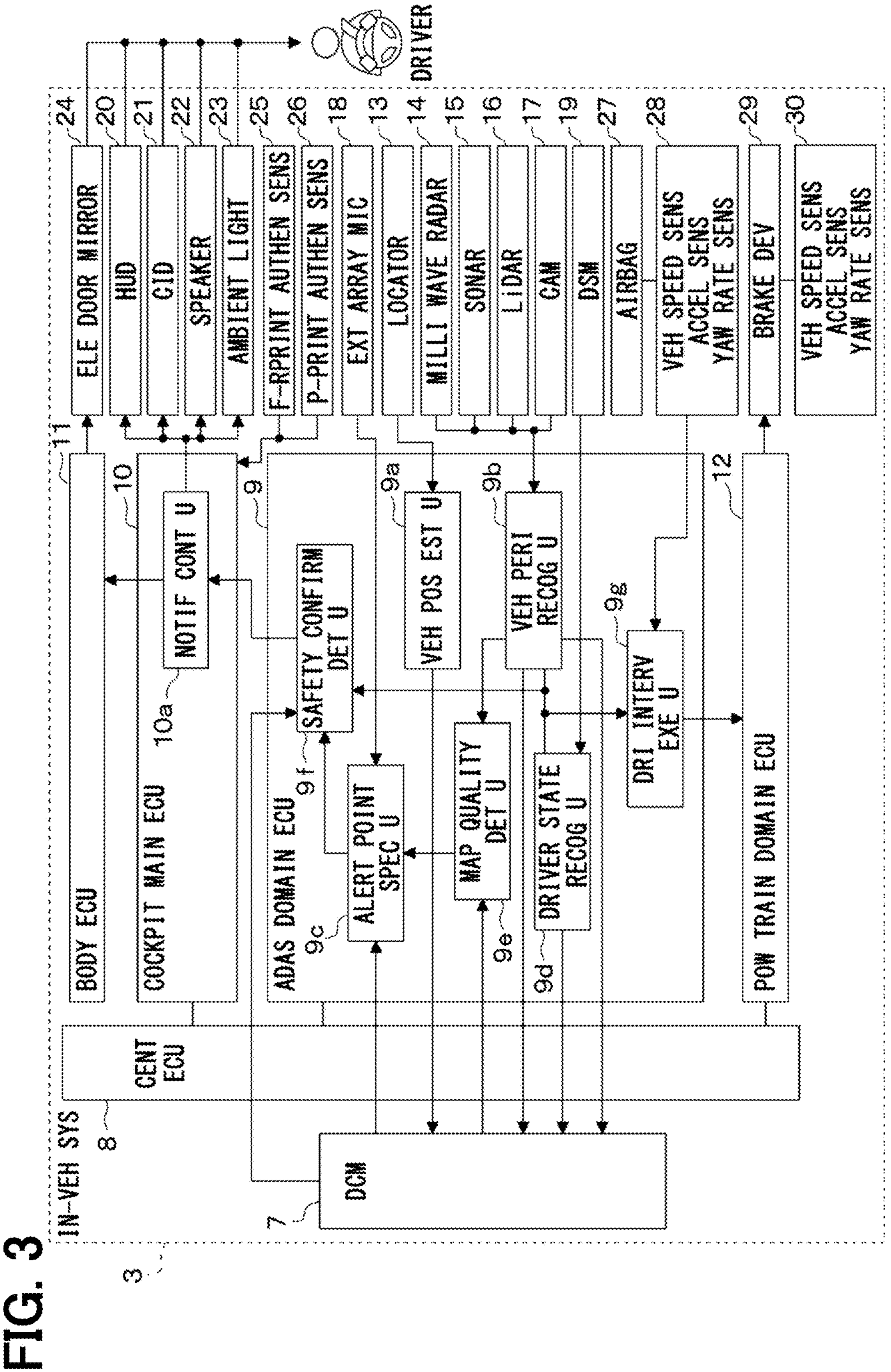
FIG. 3 is a functional block diagram showing a configuration of an in-vehicle system.

As shown in FIG. 3, the in-vehicle system 3 includes a data communication module (hereinafter referred to as DCM, i.e., data communication module) 7, a central ECU (i.e., electronic control unit) 8, and an ADAS (i.e., advanced driver assistance system) domain ECU 9, a cockpit domain ECU 10, a body ECU 11, and a powertrain domain ECU 12.

Each of the DCM 7 and the ECUS 8 to 12 is constituted by a microcomputer having a CPU (i.e., central processing unit), a ROM (i.e., read only memory), a RAM (i.e., random access memory), and an I/O (i.e., input output) device. The microcomputer executes computer programs stored in a non-transitory tangible storage medium to execute processing corresponding to the computer programs, and controls an overall operation of the DCM 7 and the ECUS 8 to 12. The microcomputer has the same meaning as a processor. The non-transitory tangible storage medium may share its hardware with another computer resource. The DCM 7 and each ECU 8 to 12 cooperate to control the overall operation of the in-vehicle system 3.

The DCM 7 has a communication function of V2X (i.e., vehicle to X), and executes communication control on the vehicle side for the data communication with an infrastructure equipment including the map generation server 4, the function management server 5 and the mobile information terminal 6.

The central ECU 8 integrally manages the ADAS domain ECU 9, the cockpit domain ECU 10, and the powertrain domain ECU 12. The ADAS domain ECU 9 includes a vehicle position estimation unit 9*a*, a vehicle periphery recognition unit 9*b*, an alert point specifying unit 9*c*, a driver state recognition unit 9*d*, a map quality determination unit 9*e*, a safety confirmation determination unit 9*f*, and a driving intervention execution unit 9*g*. The cockpit domain ECU 10 includes a notification control unit 10*a*.

The locator 13 calculates position coordinates using various parameters included in GNSS satellite signals received from GNSS (i.e., Global Navigation Satellite System) satellites, and corrects the calculated position coordinates based on detection results from a gyro sensor, a vehicle speed sensor, and the like, and then, the corrected position coordinates are output to the vehicle position estimation unit 9*a*. Here, the GNSS is a general term for global positioning and navigation satellite systems, and various systems such as GPS (i.e., Global Positioning System), GLONASS (i.e., Global Navigation Satellite System), Galileo, BeiDou, and IRNSS (i.e., Indian Regional Navigational Satellite System) have been realized. When the vehicle position estimation unit 9*a* receives the position coordinates from the locator 13, the vehicle position estimation unit 9*a* estimates the vehicle position using the input position coordinates, and outputs the estimated vehicle position to the DCM 7.

The millimeter wave radar 14 senses the periphery of the vehicle by emitting millimeter waves to the surroundings of the vehicle, and outputs the detection results to the vehicle periphery recognition unit 9*b*. The millimeter wave radar 14 has advantages such as strong straight travel, miniaturization of circuit and antenna design, high distance resolution and high angular resolution due to wide bandwidth, and resistance to environmental changes such as weather. The sonar 15 senses the periphery of the vehicle by emitting, for example, ultrasonic waves to the surroundings of the vehicle, and outputs the detection results to the vehicle periphery recognition unit 9*b*. The sonar 15 has the advantage of being reflected on glass surfaces and water surfaces.

The LiDAR (i.e., Light Detection and Ranging) 16 senses the periphery of the vehicle by irradiating the surroundings of the vehicle with laser light, and outputs the detection result to the vehicle periphery recognition unit 9*b*. The LiDAR 16 has the advantage that the laser light reflects even on non-metals and the LiDAR 16 can detect at night or during rain. The camera 17 includes an image sensor such as a CCD (i.e., Charge Coupled Device) or a CMOS (i.e., Complementary Metal Oxide Semiconductor), captures an image of the surroundings of the vehicle, and outputs the captured camera image to the vehicle periphery recognition unit 9*b*. The millimeter wave radar 14, the sonar 15, the LiDAR 16, and the camera 17 are autonomous sensors. Here, it is not necessary to include all of the millimeter wave radar 14, the sonar 15, the LiDAR 16, and the camera 17, and a configuration may be provided that the configuration includes at least one of the autonomous sensors. Alternatively, a configuration including an autonomous sensor different from the millimeter wave radar 14, the sonar 15, the LiDAR 16, and the camera 17 may be used.

The vehicle periphery recognition unit 9*b* inputs detection results from the millimeter wave radar 14, inputs detection results from the sonar 15, inputs detection results from the LiDAR 16, and inputs a camera image from the camera 17, and recognizes the surroundings of the vehicle based on the input detection results and the camera images, and outputs the recognized periphery information of the surroundings of the vehicle to the DCM 7, the map quality determination unit 9*e*, the safety confirmation determination unit 9*f*, and the driving intervention execution unit 9*g*. The periphery information includes feature information as the static information such as the location and the type of traffic lane lines, stop lines, crosswalks, and the like painted on the road surface, the location and the type of traffic lights, road signs and the like standing on the road surface, road width, road type, and number of lanes. Further, the periphery information includes dynamic and static information such as the positions of pedestrians, bicycles, and oncoming vehicles.

When the vehicle position is input from the vehicle position estimation unit 9*a* and the periphery information of the surrounds of the vehicle is input from the vehicle periphery recognition unit 9*b*, the DCM 7 transmits the probe data, which associates the input vehicle position, the periphery information of the surroundings of the vehicle, and the time, to the map generation server 4 via the communication network. In this case, the DCM 7 transmits the probe data to the map generation server 4 via the communication network, for example, at the timing when the traveling distance reaches a certain distance, the timing when the elapsed time reaches a certain time, and the like.

In the DCM 7, upon receiving the probe data map transmitted from the map generation server 4, the probe data map acquisition unit 2*a* outputs the received probe data map to the alert point specifying unit 9*c* and the map quality determination unit 9*e*.

When the map quality determination unit 9*e* inputs the periphery information of the surrounds of the vehicle from the vehicle periphery recognition unit 9*b* and inputs the probe data map from the DCM 7, the map quality determination unit 9*e* compares the probe data map with the periphery information of the surroundings of the vehicle, and determines the quality of the probe data map. The map quality determination unit 9*e* determines whether or not the feature information indicated by the probe data map matches the periphery information of the surroundings of the vehicle indicated by the detection results of the autonomous sensors, and determines the quality of the probe data map. Specifically, the map quality determination unit 9*e* determines whether the location and the type of the feature indicated by the probe data map match the location and the type of the feature included in the periphery information of the surroundings of the vehicle indicated by the detection results of the autonomous sensors, so that the map quality determination unit 9*e* determines the quality of the probe data map.

The map quality determination unit 9*e*, for example, quantifies the degree of matching between the feature information indicated by the probe data map and the periphery information of the surroundings of the vehicle indicated by the detection results of the autonomous sensors, and compares the quantified value as a threshold value. When the map quality determination unit 9*e* determines that the deviation between the feature information shown by the probe data map and the periphery information of the surroundings of the vehicle shown by the detection results of the autonomous sensors is small, and the numerical value indicating the degree of matching is equal to or greater than a threshold value, the map quality determination unit 9*e* determines that the quality of the probe data map is excellent. When the map quality determination unit 9*e* determines that the quality of the probe data map is excellent, the map quality determination unit 9*e* outputs the probe data map that has been determined to be of excellent quality to the alert point specifying unit 9*c*. When the map quality determination unit 9*e* determines that the deviation between the feature information shown by the probe data map and the periphery information of the surroundings of the vehicle shown by the detection results of the autonomous sensors is large, and the numerical value indicating the degree of matching is smaller than the threshold value, the map quality determination unit 9*e* determines that the quality of the probe data map is not excellent.

The external array microphone 18 outputs sound information collected around the vehicle to the alert point specifying unit 9*c*. The external array microphone 18 is also an autonomous sensor similar to the millimeter wave radar 14, the sonar 15, the LiDAR 16, and the camera 17 described above. When the alert point specifying unit 9*c* receives the probe data map from the map quality determination unit 9*e*, the alert point specifying unit 9*c* specifies the alert point and outputs the specified result to the safety confirmation determination unit 9*f*. The alert point is, for example, a blind spot at an intersection, and is a point where the driver needs to check safety while driving. In this case, when the sound information is input from the external array microphone 18, the alert point specifying unit 9*c* specifies the alert point by also referring to the input sound information. Here, when the probe data map is not input from the map quality determination unit 9*e*, the alert point specifying unit 9*c* specifies the alert point using the detection results of the autonomous sensors, and transmits the specified results to the safety confirmation determination unit 9*f*.

The Driver Status Monitor (registered trademark) (hereinafter referred to as DSM, i.e., Driver Status Monitor) 19 that monitors the state of the driver captures an image of the driver's face using a driver monitor camera, and determines the face direction, a line of sight direction, and determines whether the driver is shaking his head or the like, and then, the DSM 19 outputs the determination result to the driver state recognition unit 9*d*.

When the driver state recognition unit 9*d* receives the determination result from the DSM 19, the driver state recognition unit 9*d* recognizes the driver state using the determination result, and transmits driver state information indicating the recognized driver state to the DCM 7, the safety confirmation determination unit 9*f*, and the driving intervention execution unit 9*g*.

When the safety confirmation determination unit 9*f* inputs the peripheral information of the surroundings of the vehicle from the vehicle periphery recognition unit 9*b* and inputs the driver state information from the driver state recognition unit 9*d*, the safety confirmation determination unit 9*f* determines whether or not it is necessary to activate an alert using the input peripheral information of the surroundings of the vehicle and the driver state information. The safety confirmation determination unit 9*f* determines whether or not the driver's line of sight is facing the direction of the alert point in a situation where the alert point has occurred, and determines whether or not the driver is performing a safety check using the driver state, and then, determines whether or not it is necessary to activate an alert.

When the safety confirmation determination unit 9*f* determines that the driver's line of sight is directed toward the alert point, the safety confirmation determination unit 9*f* determines that there is no need to activate an alert. On the other hand, if the safety confirmation determining unit 9*f* determines that the driver's line of sight is not directed toward the alert point, the safety confirmation determining unit 9*f* determines that it is necessary to activate an alert, and outputs a notification instruction to the notification control unit 10*a*.

When the notification control unit 10*a* inputs the notification instruction from the safety confirmation determination unit 9*f*, the notification control unit 10*a* transmits the drive instruction to a head-up display (hereinafter referred to as HUD) 20 and a center information display (hereinafter referred to as CID) 21, a speaker 22, and an ambient light 23, and also outputs a notification instruction to the body ECU 11. The notification control unit 10*a* activates an alert in the HUD 20, the CID 21, the speaker 22, the ambient light 23, and an electronic rear view mirror 24 near the driver's line of sight, and notifies the driver of non-execution information of the safety check indicating that the driver has not performed a safety check.

The alert is, for example, a message or an icon that urges the safety check to be made to the alert point. When the driver's line of sight is directly ahead in the travel direction of the vehicle, the notification control unit 10*a* displays a message, an icon, and the like on the HUD 20 in front of the driver, for example. When the driver's line of sight is toward the right and forward in the travel direction of the vehicle, the notification control unit 10*a* displays a message, an icon, and the like on the HUD 20, for example, on the right front side of the driver. When the driver's line of sight is toward the left and forward in the travel direction of the vehicle, the notification control unit 10*a* displays a message, an icon, and the like on the HUD 20, for example, on the left front side of the driver. Further, the notification control unit 10*a* may cause the CID 21 to display, for example, a message, an icon, or the like urging the safety check of the alert point. Further, the notification control unit 10*a* may output a sound from the speaker 22, for example, a message urging the safety check of the alert point. By activating the alert in this way, it is possible to make the driver aware that the driver is not paying attention to the alert point.

Further, when the recommend function information transmitted from the function management server 5 is received by the in-vehicle system 3 as described above, the notification control unit 10*a* causes the HUD 20 or the CID 21 to display the received recommend function information, or causes the speaker 22 to output the sound, so that the notification control unit 10*a* presents the driver of the recommend function specified by the recommend function information. The notification control unit 10*a* corresponds to a recommend function presentation unit. A recommend function presentation program executed by the in-vehicle system 3 is realized by the notification control unit 10*a*.

The fingerprint authentication sensor 25 senses the driver's fingerprint and outputs the detection result to the cockpit domain ECU 10. The palmprint authentication sensor 26 senses the driver's palmprint and outputs the detection result to the cockpit domain ECU 10. When the cockpit domain ECU 10 receives detection results from the fingerprint authentication sensor 25 and the palmprint authentication sensor 26, the cockpit domain ECU 10 personally authenticate the driver using the input detection results, and outputs the authentication results to the central ECU 8.

The sensor group 28 attached to the airbag 27 includes, for example, a vehicle speed sensor, an acceleration sensor, and a yaw rate sensor, and detects the vehicle speed, the acceleration, and the yaw rate, respectively, and outputs the detection results to the driving intervention execution unit 9*g*. The sensor group 28 may be attached to the ADAS domain ECU 9 or the central ECU 8.

When the driving intervention execution unit 9*g* receives the periphery information of the surroundings of the vehicle from the vehicle periphery recognition unit 9*b*, receives the driver state information from the driver state recognition unit 9*d*, and receives the detection results from the sensor group 28 attached to the airbag 27, the driving intervention execution unit 9*g* determines whether or not it is necessary to intervene in the driver's driving operation using the input peripheral information of the surroundings of the vehicle, the driver state information, and the detection results. The driving intervention execution unit 9*g* determines, for example, whether the driver's line of sight is facing the direction in which the vehicle is traveling, whether the direction in which the vehicle is traveling is dangerous, and whether the vehicle speed, the acceleration, and the yaw rate are proper, so that the driving intervention execution unit 9*g* determines whether or not it is necessary to intervene with respect to the driver's driving operation.

When the driving intervention execution unit 9*g* determines, for example, that the driver's line of sight is facing the direction in which the vehicle is traveling, that the direction in which the vehicle is traveling is not dangerous, and that the vehicle speed, the acceleration, and the yaw rate are proper, and that the driver's driving operation is appropriate, the driving intervention execution unit 9*g* determines that there is no need to intervene in the driver's driving operation. On the other hand, when the driving intervention execution unit 9*g* determines whether, for example, the driver's line of sight is not facing the direction in which the vehicle is traveling, the direction in which the vehicle is traveling is dangerous, or the vehicle speed, the acceleration, and the yaw rate are not proper, the driving intervention execution unit 9*g* determines that the driver's driving operation is not appropriate, and that it is necessary to intervene with respect to the driver's driving operation, so that the driving intervention execution unit 9*g* outputs the driving intervention instruction to the power train domain ECU 12.

When the power train domain ECU 12 receives a driving intervention instruction from the driving intervention execution unit 9*g*, the power train domain ECU 12 outputs the driving intervention instruction to the brake device 29. The sensor group 30 attached to the brake device 29 includes, for example, a vehicle speed sensor, an acceleration sensor, and a yaw rate sensor, detects the vehicle speed, the acceleration, and the yaw rate, respectively, and outputs the detection results to the brake device 29. The sensor group 30 may be attached to the powertrain domain ECU 12 or the central ECU 8. When a driving intervention instruction is input from the power train domain ECU 12, the brake device 29 performs collision damage reduction braking (hereinafter referred to as AEB, i.e., Autonomous Emergency Braking) control using, for example, the detection results of the sensor group 30. Here, in addition to the AEB control, steering control, attitude control, and the like may be performed as intervention in the driving operation, and for example, an anti-skid control (hereinafter referred to as ESC, i.e., electronic stability control) may be performed.

Next, the operation of the above configuration will be described with reference to FIGS. 4 to 12. The personal authentication processing, the probe data transmission processing, the driving diagnosis processing, and the recommend function presentation processing will be described as processing performed by the in-vehicle system 3, and the recommend function distribution processing will be described as processing performed by the function management server 5. The function management server 5 performs the recommend function distribution processing using a recommend function distribution program. The in-vehicle system 3 performs the recommend function presentation processing using a recommend function presentation program.

Figure 4:
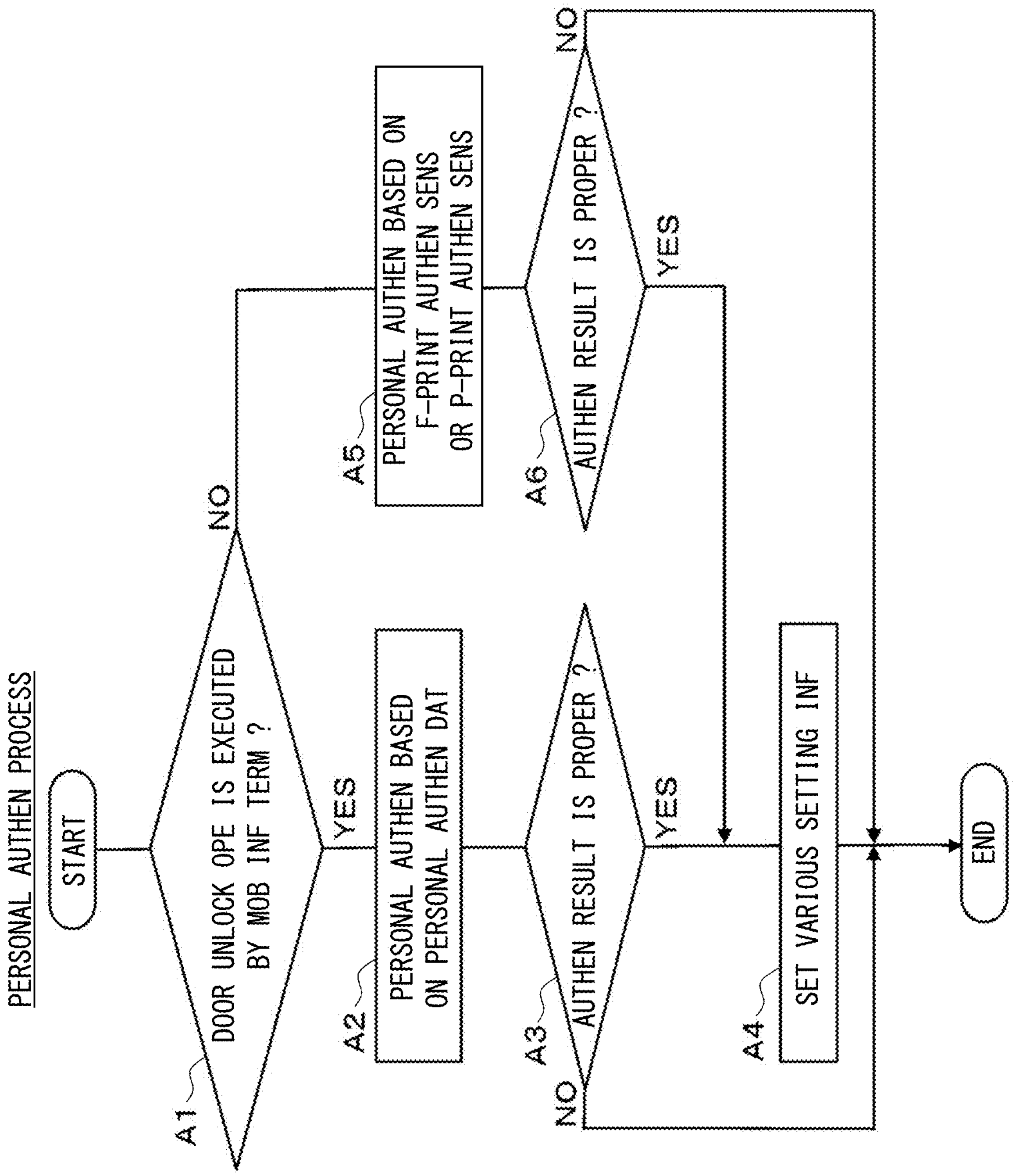
FIG. 4 is a flowchart showing a personal authentication process performed by the in-vehicle system.

(1-1) Personal Authentication Processing Performed by the In-Vehicle System 3 (see FIG. 4)

The in-vehicle system 3 starts executing the personal authentication process when the start condition for the personal authentication process is satisfied by unlocking the door. When the in-vehicle system 3 starts executing the personal authentication process, the in-vehicle system 3 determines whether or not the door is unlocked by an operation using the mobile information terminal 6 (at A1). When the in-vehicle system 3 determines that the door is unlocked by an operation using the mobile information terminal 6 ("YES" at A1), the in-vehicle system 3 performs personal authentication using personal authentication data (at A2). That is, the in-vehicle system 3 receives and acquires the personal authentication data transmitted from the mobile information terminal 6, and compares the acquired personal authentication data with registration data registered in advance. When the in-vehicle system 3 determines whether or not the authentication result is proper (at A3), determines that the personal authentication data matches the registration data, and determines that the authentication result is proper ("YES" at A3), the in-vehicle system 3 sets various setting information registered in association with the personal ID (at A4), and ends the personal authentication process.

The various setting information registered in association with the personal ID is, for example, information regarding ADAS information, air conditioning information, power train information, music information, cockpit screen information, and the like, and the in-vehicle system 3 sets the ADAS condition, the air conditioning condition, the power train condition, the music condition, the cockpit screen condition, and the like. Further, if the destination is registered in the navigation application of the mobile information terminal 6, the in-vehicle system 3 sets the destination registered in the mobile information terminal 6. Further, when the history of driver inquiry information is stored by the application of the automatic conversation service in the mobile information terminal 6, the in-vehicle system 3 sets the driver inquiry information stored in the mobile information terminal 6. Furthermore, if the history of the driver's comment information is stored by an application of an online communication service using the website in the mobile information terminal 6, the in-vehicle system 3 sets the comment information of the driver stor3ed in the mobile information terminal 6.

On the other hand, if the in-vehicle system 3 determines that the door unlocking is not performed by the mobile information terminal 6 ("NO" at A1), the in-vehicle system 3 performs the personal authentication based on the detection results of the fingerprint authentication sensor 25 and the palmprint authentication sensor 26 (at A5). The in-vehicle system 3 determines whether or not the authentication result is proper (at A6), and determines that the detection result of the fingerprint authentication sensor 25 and the detection result of the palmprint authentication sensor 26 are proper, and determines that the authentication result is proper ("YES" at A6), also in this case, the in-vehicle system 3 sets various setting information registered in association with the personal ID (at A4), and ends the personal authentication process.

Figure 5:
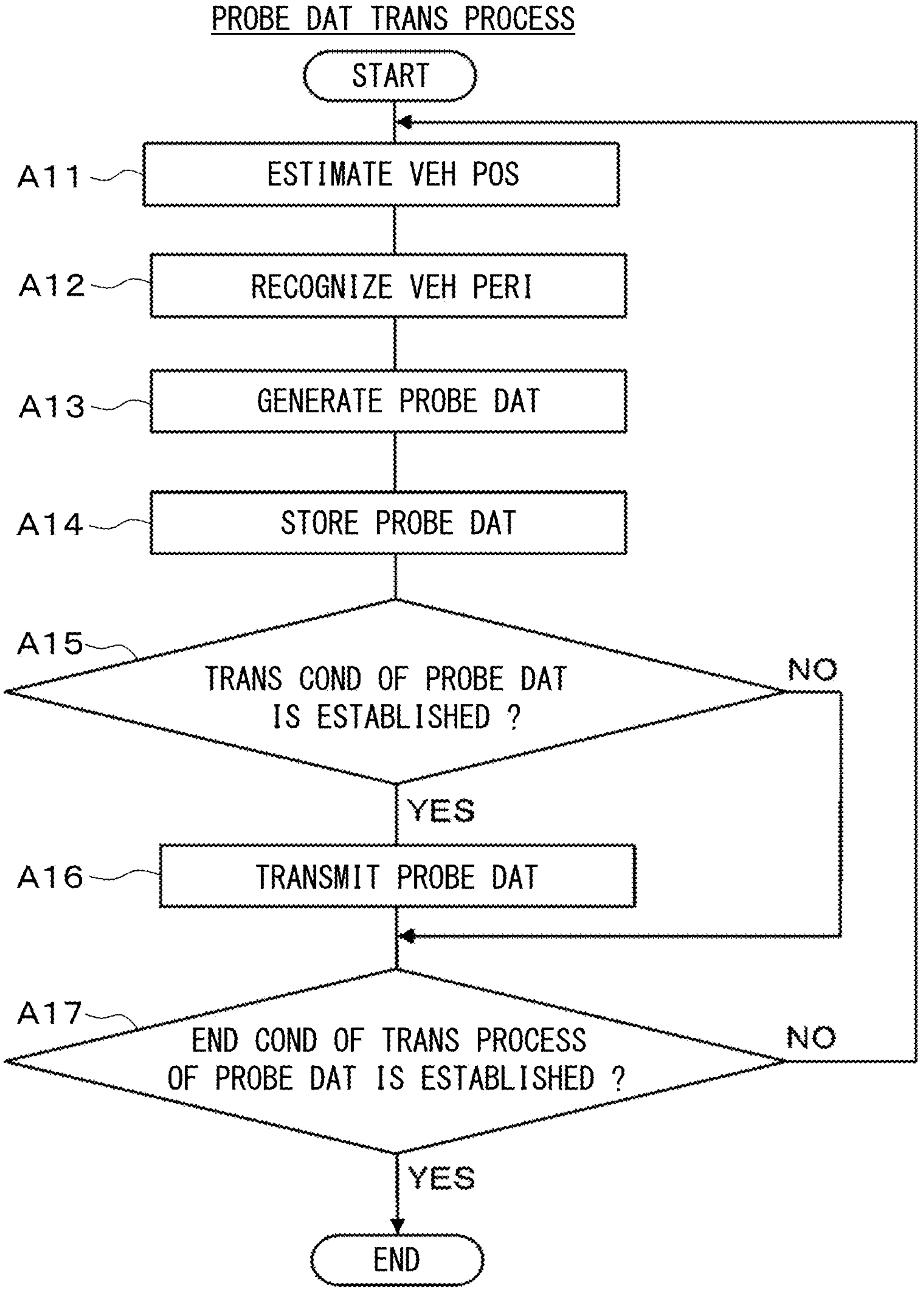
FIG. 5 is a flowchart showing a probe data transmission process performed by the in-vehicle system.
Figure 6:
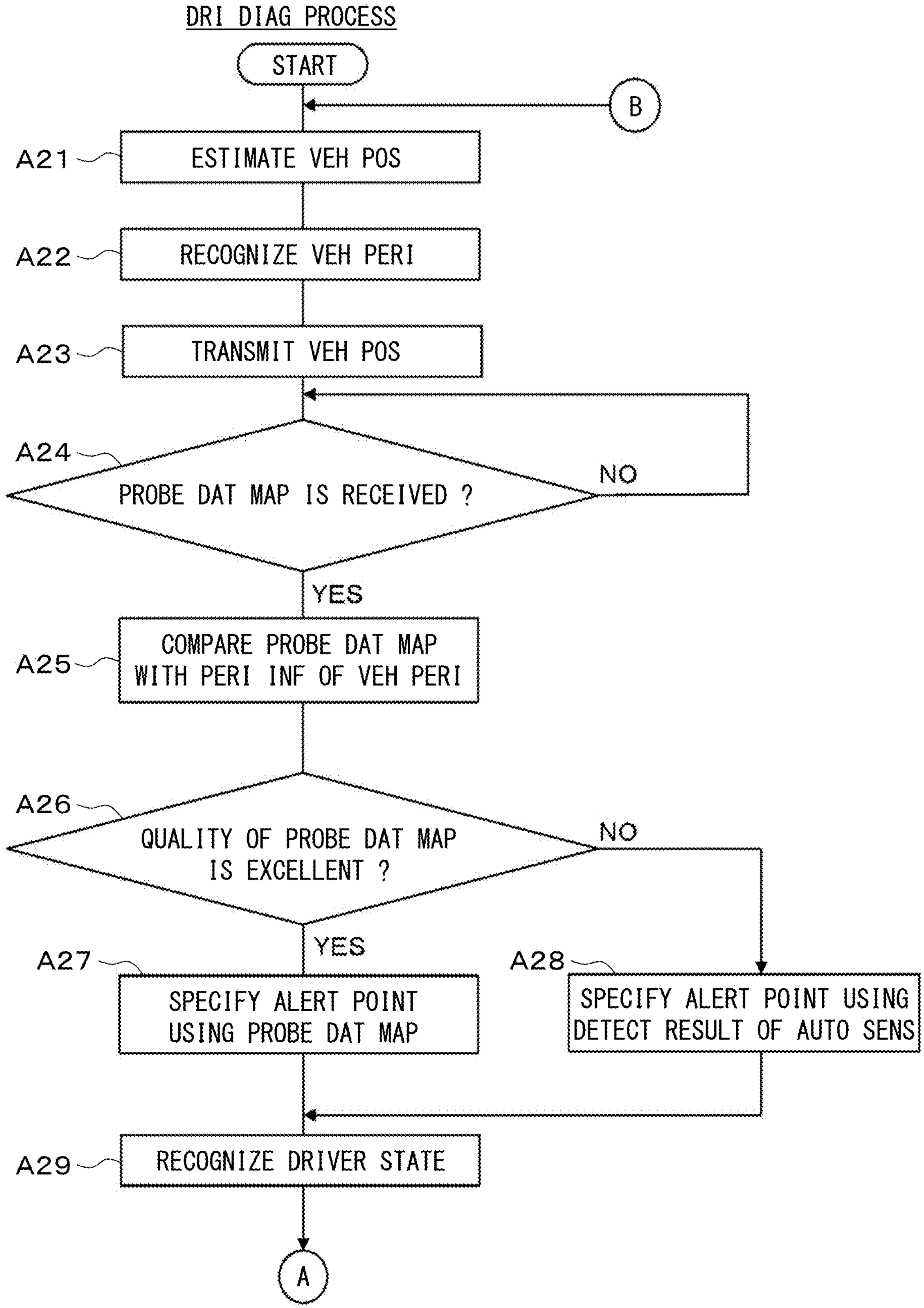
FIG. 6 is a flowchart showing a driving diagnosis process performed by the in-vehicle system.
Figure 7:
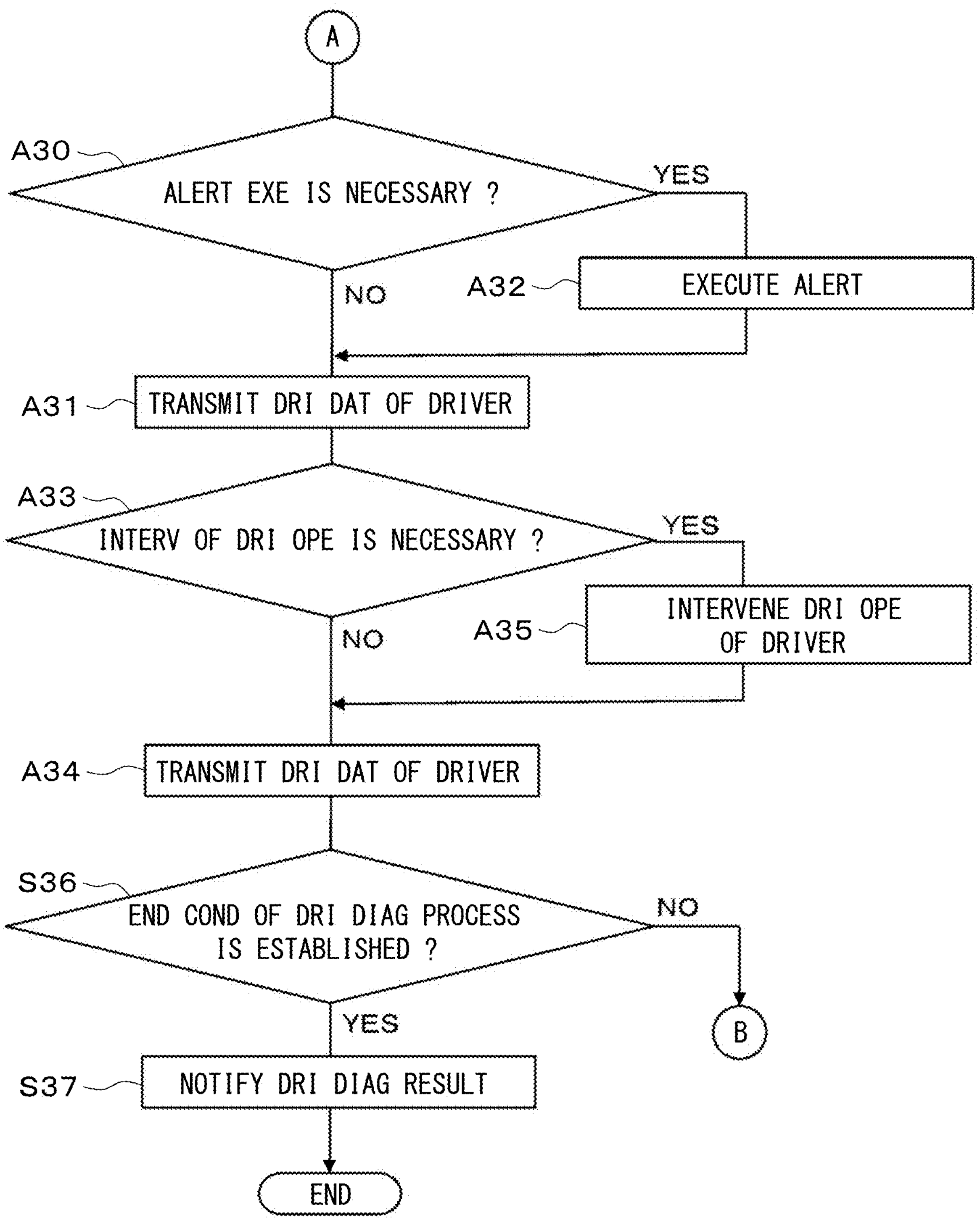
FIG. 7 is a flowchart showing the driving diagnosis process performed by the in-vehicle system.

(1-2) Probe Data Transmission Processing Performed by In-Vehicle System 3 (see FIG. 5)

The in-vehicle system 3 starts executing the probe data transmission process when a start condition for the probe data transmission process is satisfied, for example, by turning on the ignition switch. When the in-vehicle system 3 starts executing the probe data transmission process, the in-vehicle system 3 estimates the vehicle position based on the position coordinates input from the locator 13 using the vehicle position estimation unit 9*a* (at A11). The in-vehicle system 3 uses the detection results input from the millimeter wave radar 14, the detection results input from the sonar 15, the detection results input from the LiDAR 16, and the camera image input from the camera 17 to recognize the surroundings of the vehicle by the vehicle periphery recognition unit 9*b* (at A12). The in-vehicle system 3 generates probe data by associating the vehicle position estimated by the vehicle position estimation unit 9*a*, the periphery information of the surroundings of the vehicle recognized by the vehicle periphery recognition unit 9*b*, and the time (at A13), and stores the generated probe data in the data storage area (at A14).

The in-vehicle system 3 determines whether the transmission condition of the probe data is satisfied (at A15), and transmits the probe data stored in the data storage area from the DCM 7 to the map generation server 4 via the communication network (at A16) when the in-vehicle system 3 determines that the transmission condition of the probe data is satisfied ("YES" at A15), for example, at the timing when the traveling distance reaches a certain distance, the timing when the elapsed time reaches a certain time, and the like.

For example, the in-vehicle system 3 determines whether the termination condition for the probe data transmission process is satisfied by turning off the ignition switch for example (at A17), and the in-vehicle system 3 returns to step A11 described above and repeats step A11 and subsequent steps when the in-vehicle system 3 determines that the termination condition for the probe data transmission process is not satisfied since the ignition switch remains to turn on ("NO" at A17). When the in-vehicle system 3 determines that the termination condition for the probe data transmission process is satisfied by turning off the ignition switch ("YES" at A17), the in-vehicle system 3 ends the probe data transmission process.

(1-3) Driving Diagnosis Process Performed by the In-Vehicle System 3 (see FIGS. 6 to 10)

The in-vehicle system 3 starts executing the driving diagnostic process when the start condition for the driving diagnostic process is satisfied, for example, by turning on the ignition switch. When the in-vehicle system 3 starts executing the driving diagnosis process, the vehicle position estimation unit 9*a* estimates the vehicle position using the position coordinates input from the locator 13 (at A21). The in-vehicle system 3 uses the detection results input from the millimeter wave radar 14, the detection results input from the sonar 15, the detection results input from the LiDAR 16, and the camera image input from the camera 17 to recognize the surroundings of the vehicle by the vehicle periphery recognition unit 9*b* (at A22).

The in-vehicle system 3 transmits the vehicle position estimated by the vehicle position estimation unit 9*a* from the DCM 7 to the map generation server 4 via the communication network (at A23), and waits for reception of the probe data map from the map generation server 4 (at A24). When the map generation server 4 receives the vehicle position transmitted from the in-vehicle system 3, the map generation server 4 specifies a segment of the probe data map corresponding to the received vehicle position, and transmits the identified probe data map via the communication network to the in-vehicle system 3, which is the transmission source of the vehicle position. Here, steps A21 to A23 may be performed in steps A11 to A16 of the probe data transmission process. That is, the in-vehicle system 3 may transmit the vehicle position by transmitting the probe data, and when the map generation server 4 receives the probe data transmitted from the in-vehicle system 3, the map generation server 4 specifies the vehicle position from the received probe data, specifies the segment of the probe data map corresponding to the specified vehicle position, and transmits the specified probe data map to the in-vehicle system 3, which is the transmission source of the vehicle position, via the communication network.

When the in-vehicle system 3 determines that the probe data map transmitted from the map generation server 4 has been received by the DCM 7 ("YES" at A24), the in-vehicle system 3 compares the received probe data map with the periphery information of the surroundings of the vehicle (at A25), and then, determines the quality of the probe data map by the map quality determination unit 9*e* (at A26). When the in-vehicle system 3 determines that the deviation between the feature information shown by the probe data map and the periphery information of the surroundings of the vehicle shown by the detection results of the autonomous sensors is small and the quality of the probe data map is excellent ("YES" at A26), the in-vehicle system 3 specifies the alert point using the probe data map determined to be of excellent quality (at A27).

On the other hand, when the in-vehicle system 3 determines that the quality of the probe data map is not excellent since the deviation between the feature information shown by the probe data map and the periphery information of the surroundings of the vehicle shown by the detection results of the autonomous sensors is large ("NO" at A26), the in-vehicle system 3 specifies the alert point using the detection results of the autonomous sensors (at A28).

The in-vehicle system 3 inputs the determination result of the driver's face image captured by the driver monitor camera, and recognizes the driver state using the driver state recognition unit 9*d* (at A29). The in-vehicle system 3 determines whether or not the driver's line of sight is facing the direction of the alert point in a situation where the alert point has occurred, and determines whether or not the driver is performing a safety check using the driver state, and then, determines whether or not it is necessary to activate an alert by the safety check determination unit 9*f* (at A30).

When the in-vehicle system 3 determines that the driver's line of sight is directed toward the alert point and determines that it is not necessary to activate an alert ("NO" at A30), the in-vehicle system 3 transmits the driving data of the driver from the DCM 7 via the communication network to the function management server 5 (at A31).

On the other hand, when the in-vehicle system 3 determines that the driver's line of sight is not facing the direction of the alert point and determines that it is necessary to activate an alert ("YES" at A30), the in-vehicle system 3 drives the HUD 20, the CID 21, the speaker 22, and the ambient light 23 and the like to activate the alert by the notification control unit 10*a* at a location close to the driver's line of sight (at A32), and transmits the driving data of the driver from the DCM 7 to the function management server 5 via the communication network (at A31).

Figure 8:
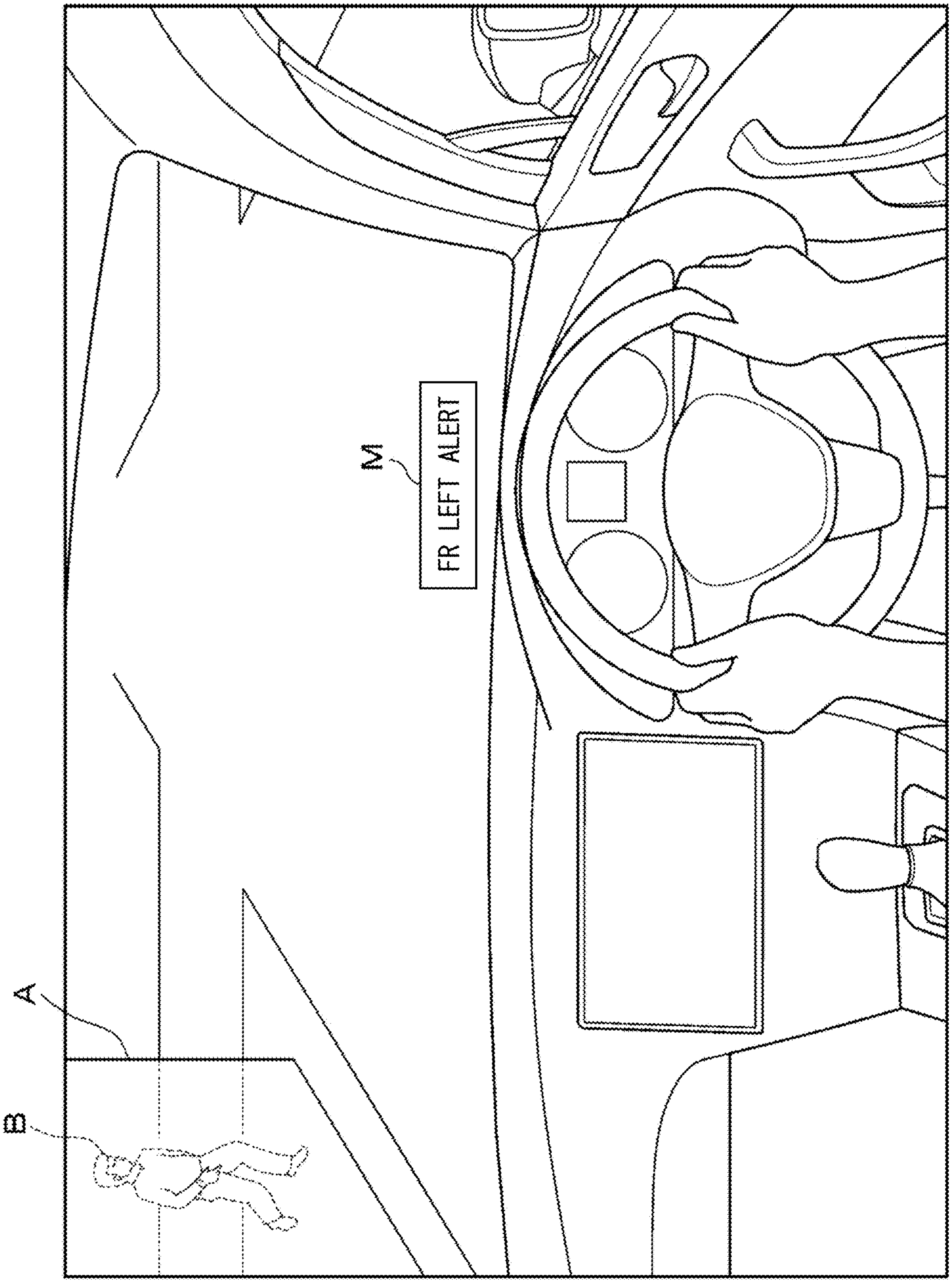
FIG. 8 is a diagram showing a feature in which the in-vehicle system displays driving alert information.

That is, as shown in FIG. 8, the in-vehicle system 3 specifies the left front side of the vehicle as an alert point because there is a possibility that a pedestrian B may jump out from behind a building A on the left front side of the vehicle, but if the in-vehicle system 3 determines that the driver's line of sight is not directed toward the left front side of the vehicle, the in-vehicle system 3 determines that it is necessary to activate the alert. For example, when the in-vehicle system 3 determines that the driver's line of sight is directly ahead in the direction in which the vehicle is traveling, the in-vehicle system 3 causes the HUD 20 to display a message M such as "Caution to the left ahead" in front of the driver. Here, the alert may be activated in any manner as long as the driver can recognize the activation of the alert.

The in-vehicle system 3 inputs the periphery information of the surroundings of the vehicle, inputs driver state information, inputs detection results from a sensor group 28 attached to an airbag 27, and determines by the driving intervention execution unit 9*g* whether it is necessary to intervene in the driver's driving operation (at A33). For example, when the in-vehicle system 3 determines that the driver's line of sight is facing the travelling direction of the vehicle, determines that the travelling direction of the vehicle is not dangerous, and determines that the vehicle speed, the acceleration, and the yaw rate are proper, and determines that it is not necessary to intervene in the driver's driving operation ("NO" at A33), the in-vehicle system 3 transmits the driving data of the driver from the DCM 7 to the function management server 5 via the communication network (at A34).

On the other hand, for example, when the in-vehicle system 3 determines that the driver's line of sight is not facing the direction in which the vehicle is traveling, determines that the direction in which the vehicle is traveling is dangerous, or determines that the vehicle speed, the acceleration, and the yaw rate are not proper, and determines that it is necessary to intervene in the driver's driving operation ("YES" at A33), the in-vehicle system 3 performs the ABS control using the power train domain ECU 12, performs the intervention in the driver's driving operation (at A35), and transmits the driving data of the driver to the DCM 7 from the function management server 5 via the communication network (at A34).

Figure 9:
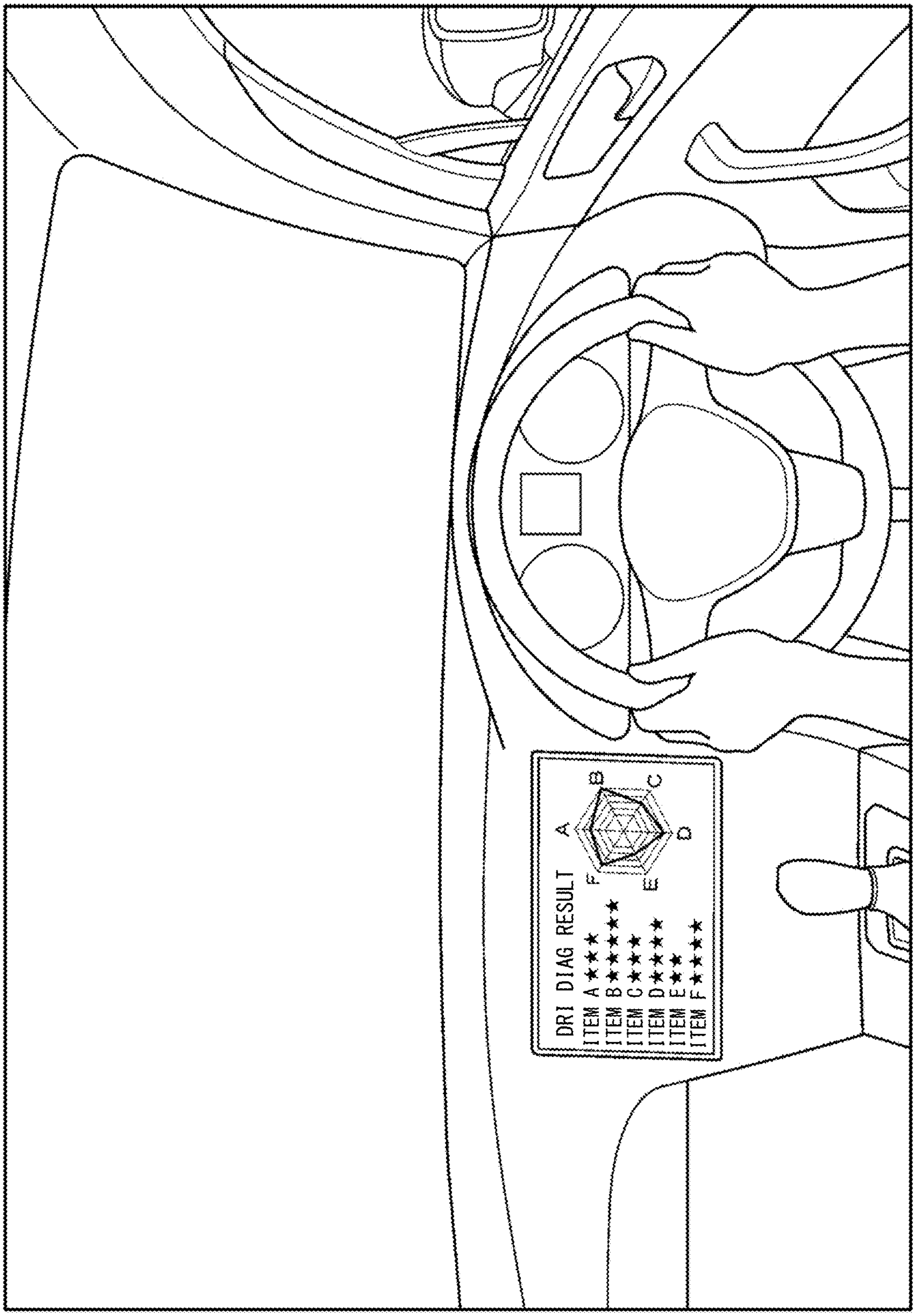
FIG. 9 is a diagram showing a feature in which the in-vehicle system displays a driving diagnosis result.

For example, the in-vehicle system 3 determines whether the condition for ending the driving diagnosis process is satisfied by turning off the ignition switch, for example (at A36), and when the in-vehicle system 3 determines that the condition for ending the driving diagnosis process is not satisfied with maintaining the ignition to turn on ("NO" at A36), the in-vehicle system 3 returns to step A21 described above and repeats step A21 and subsequent steps. When the in-vehicle system 3 determines that the condition for ending the driving diagnosis process is satisfied by turning off the ignition switch ("YES" at A36), the in-vehicle system 3 displays the driving diagnosis result based on the driving data of the driver on the center display, the meter display, and the like (at A37), and ends the driving diagnosis process. As shown in FIG. 9, the in-vehicle system 3 displays, for example, the driving diagnosis result for six items A to F on the center display, the meter display, or the like. Each of the six items A to F is an index that indicates whether or not the driver's driving operation is safe, and, for example, the index evaluates the frequency of sudden acceleration, the frequency of sudden deceleration, the frequency of sudden steering, and the like on a five-point scale.

Figure 10:
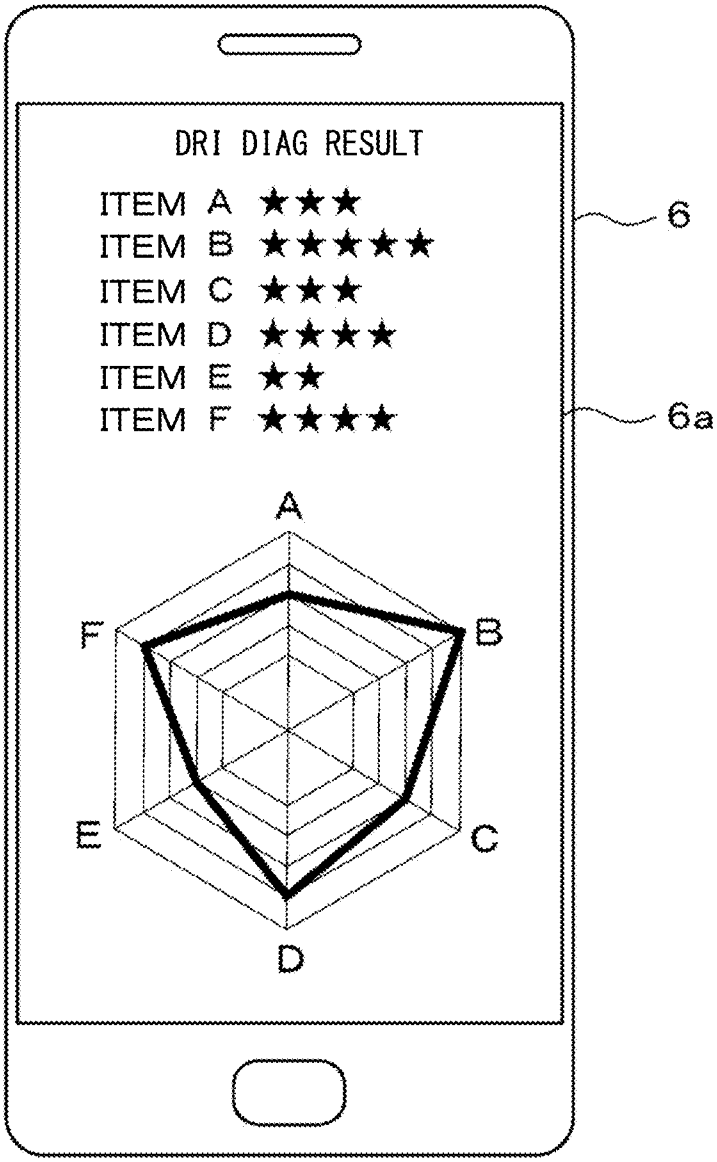
FIG. 10 is a diagram showing a feature in which a mobile information terminal displays the driving diagnosis result.

Further, as shown in FIG. 10, when the mobile information terminal 6 is in a state where the data communication with the in-vehicle system 3 is available, upon receiving the driving diagnosis result transmitted from the in-vehicle system 3, the mobile information terminal 6 may display the received driving diagnosis result on the display 6*a*. When the driver can recognize the driving diagnosis result, the driving diagnosis result displayed on the center display, the meter display, and the like of the in-vehicle system 3 and the driving diagnosis result displayed on the display 6*a* of the mobile information terminal 6 may be in any display manner.

Figure 11:
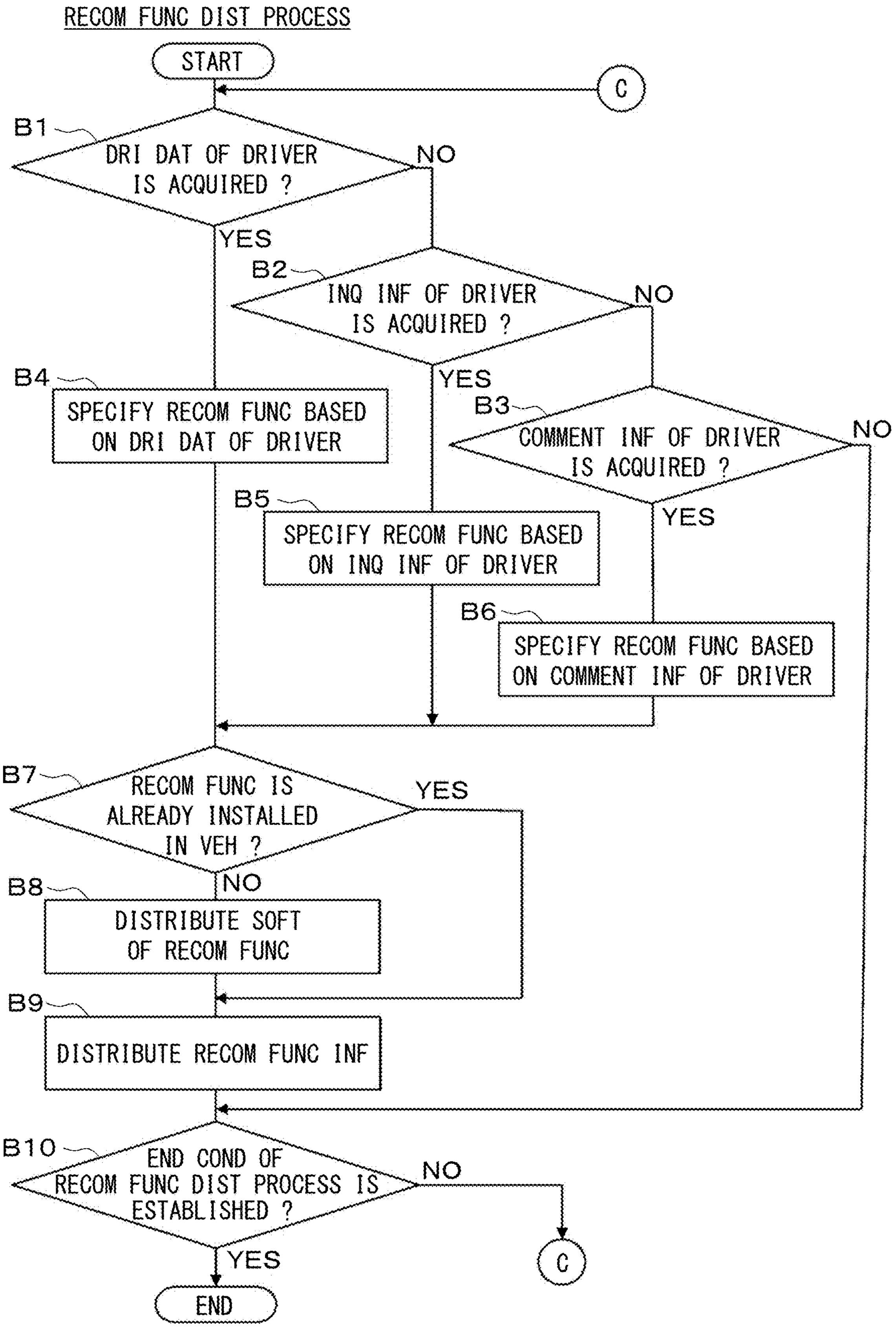
FIG. 11 is a flowchart showing a recommend function distribution process performed by the function management server.

(1-4) Recommend Function Distribution Process Performed by the Function Management Server 5 (see FIG. 11)

The function management server 5 starts executing the recommend function distribution process when the start condition for the recommend function distribution process is satisfied. When the function management server 5 starts executing the recommend function distribution process, the function management server 5 determines whether or not the driving data of the driver transmitted from the mobile information terminal 6 has been received and acquired (at B1), and determines whether or not the inquiry information of the driver transmitted from the mobile information terminal 6 has been received and acquired (at B2), and then, determines whether the comment information of the driver transmitted from the mobile information terminal 6 has been received and acquired (at B3).

When the function management server 5 determines that the driving data of the driver transmitted from the mobile information terminal 6 has been received and acquired ("YES" at B1, corresponding to the driving data acquisition procedure), the function management server 5 specifies the recommend function based on the acquired driving data of the driver from the in-vehicle system 3 (at B4, corresponding to the first recommend function specifying procedure). In this case, the function management server 5 may specify the recommend function by comparing the driving data of the driver acquired from the in-vehicle system 3 with the driving data of another driver at the same location.

When the function management server 5 determines that the inquiry information of the driver transmitted from the mobile information terminal 6 has been received and acquired ("YES" at B2, corresponding to the inquiry information acquisition procedure), the function management server 5 specifies the recommend function based on the acquired inquiry information of the driver (at B5, corresponding to a second recommend function specifying procedure).

When the function management server 5 determines that the comment information of the driver transmitted from the mobile information terminal 6 has been received and acquired ("YES" at B3, corresponding to the comment information acquisition procedure), the function management server 5 specifies the recommend function based on the acquired comment information of the driver (at B6, corresponding to a third recommend function specifying procedure).

In this way, when the function management server 5 specifies the recommend function based on any one of the driving data of the driver, the inquiry information of the driver from the utilization of the automatic conversation service, or the comment information of the driver from the utilization of the online communication service using the website, the function management server 5 determines whether the specified recommend function is already installed in the vehicle (at B7).

When the function management server 5 determines that the specified recommend function is not already installed in the vehicle and is an uninstalled function ("NO" at B7), the function management server 5 distributes the software of the specified recommend function to the in-vehicle system 3 (at B8), and distributes the recommend function information regarding the specified recommend function to the in-vehicle system 3 (at B9, corresponding to an information distribution procedure). On the other hand, when the function management server 5 determines that the specified recommend function is already installed in the vehicle and is an installed function ("YES" at B7), the function management server 5 distributes the recommend function information to the in-vehicle system 3 without distributing the software of the specified recommend function to the in-vehicle system 3 (at B9, corresponding to an information distribution procedure).

The function management server 5 determines whether the end condition for the recommend function distribution process is satisfied (at B10), and when the function management server 5 determines that the end condition for the recommend function distribution process is not satisfied ("NO" at B10), the function management server 5 returns to step S1 described above, and repeats step B1 and subsequent steps. When the in-vehicle system 3 determines that the end condition for the recommend function distribution process is satisfied ("YES" at B10), the in-vehicle system 3 ends the recommend function distribution process.

Figure 12:
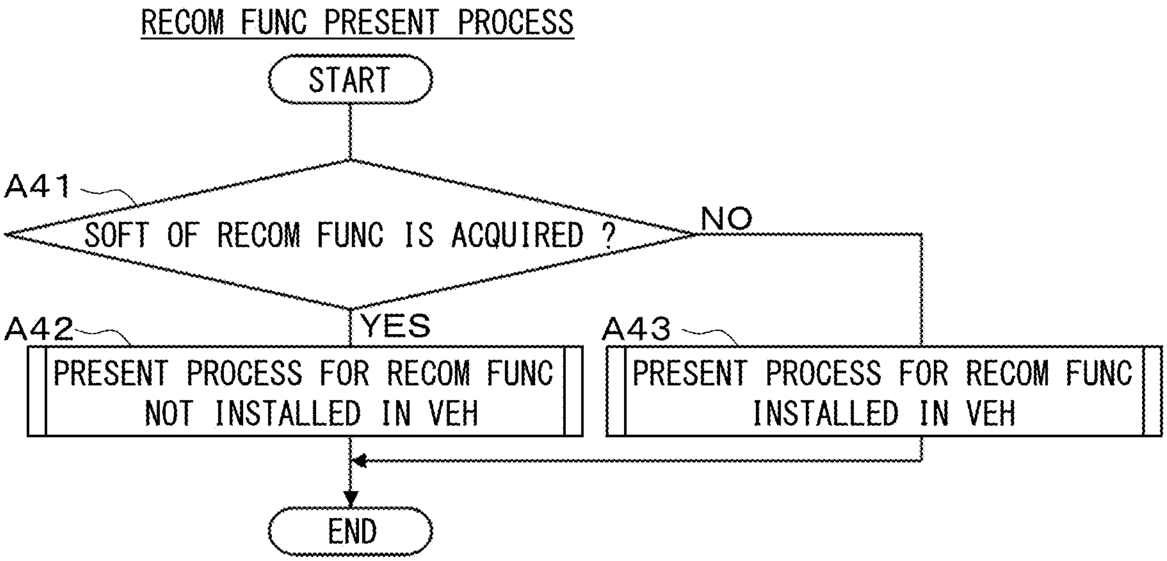
FIG. 12 is a flowchart showing a recommend function presentation process performed by the in-vehicle system.
Figure 13:
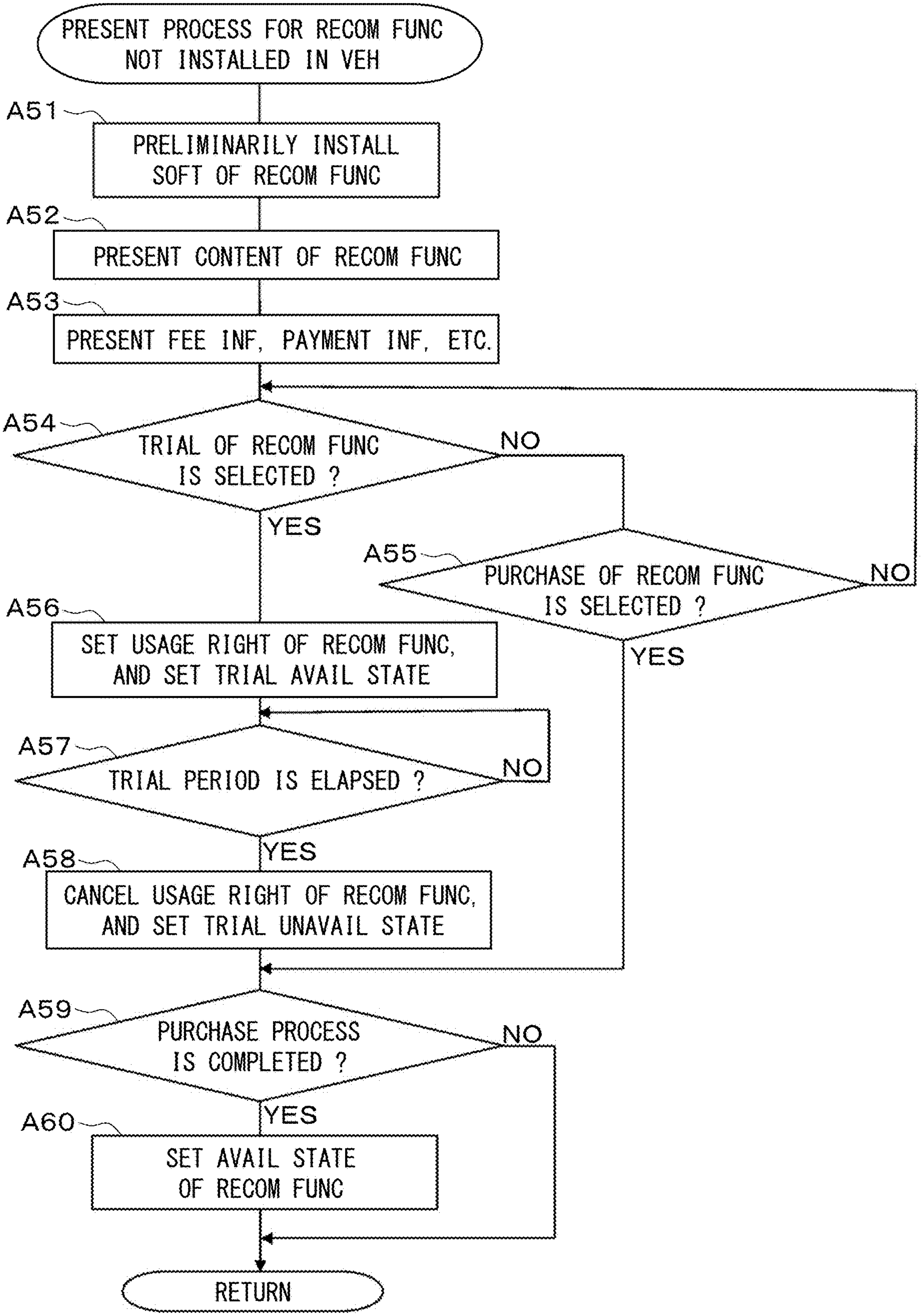
FIG. 13 is a flowchart showing the recommend function presentation process performed by the in-vehicle system.
Figure 14:
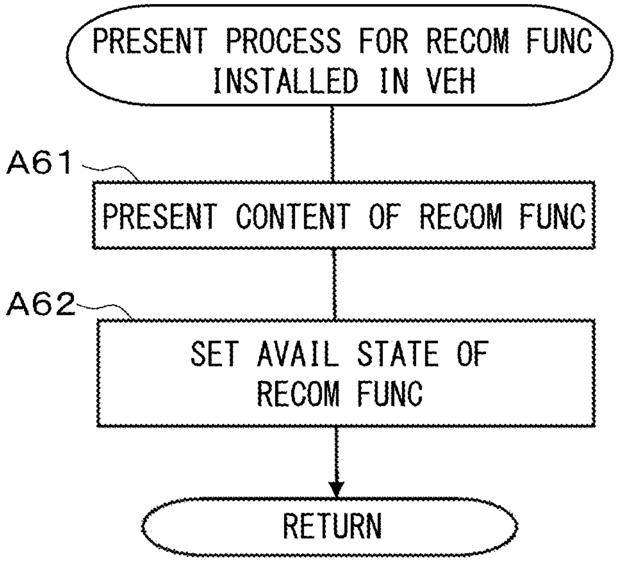
FIG. 14 is a flowchart showing the recommend function presentation process performed by the in-vehicle system.

(1-5) Recommend Function Presentation Process Performed by the In-Vehicle System 3 (see FIGS. 12 to 14)

When the in-vehicle system 3 receives and acquires the recommend function information transmitted from the function management server 5 and thereby the start condition for the recommend function presentation process is satisfied, the in-vehicle system 3 starts executing the recommend function presentation process.

When the in-vehicle system 3 starts executing the recommend function presentation process, the in-vehicle system 3 determines whether or not the software of the recommend function transmitted from the function management server 5 has been received and acquired (at A41). When the in-vehicle system 3 determines that the software of the recommend function has been acquired ("YES" at A41), the in-vehicle system 3 shifts to the presentation process for recommend function not installed in the vehicle (at A42). On the other hand, when the in-vehicle system 3 determines that the software of the recommend function has not been acquired ("NO" at A41), the in-vehicle system 3 shifts to the presentation process for recommend function installed in the vehicle (at A43).

When the in-vehicle system 3 shifts to the presentation process for recommend function not installed in the vehicle, the n-vehicle system 3 pre-installs the software of the recommend function downloaded from the function management server 5 (at A51), and displays the contents of the recommend function specified by the recommend function information using an illustration and a movement (at A52, corresponding to a recommend function presentation procedure). The in-vehicle system 3 presents price information regarding the price for purchasing the recommend function, payment information regarding payment, and the like (at A53), and waits for the driver to select whether to try out the recommend function or to purchase the recommend function (at A54 and A55).

When the in-vehicle system 3 determines that the driver has selected trial use of the recommend function ("YES" at A54), the in-vehicle system 3 temporarily sets the usage right to use the recommend function and sets the recommend function in a trial available state (at A56). In this case, the in-vehicle system 3 notifies the driver that the recommend function is available for the trial use, for example, by changing the color of the icon display of the recommend function.

The in-vehicle system 3 attaches a deadline to the period for presenting the recommend function, determines whether or not a preset trial period has elapsed (at A57), and when the in-vehicle system 3 determines that the preset trial period has elapsed ("YES" at A57), the in-vehicle system 3 cancels the trial use of the recommend function and sets the recommend function in a trial unavailable state (at A58). In this case, the in-vehicle system 3 notifies the driver that the recommend function is not available for the trial use, for example, by changing the color of the icon display of the recommend function to return to the previous color. The in-vehicle system 3 waits for the completion of the purchase procedure for the recommend function (at A59).

When the in-vehicle system 3 determines that the purchase procedure for the recommend function is completed by the driver performing the purchase procedure for the recommend function ("YES" at A59), the in-vehicle system 3 sets the recommend function to an available state (at A60). In this case, the in-vehicle system 3 notifies the driver of the recommend function for which the purchase procedure has been completed so as to be distinguishable from the recommend function for which the purchase procedure has not been completed, for example by changing the color of the icon display of the recommend function. When the in-vehicle system 3 sets the recommend function to the available state, the in-vehicle system 3 ends the presentation process for recommend function not installed in the vehicle, returns to the recommend function presentation process, and ends the recommend function presentation process.

Further, when the in-vehicle system 3 determines that the driver has selected the purchase of the recommend function ("YES" at A55), the in-vehicle system 3 waits for the completion of the purchase procedure for the recommend function without setting the above-mentioned recommend function to a trial available state (at A59). When the in-vehicle system 3 determines that the purchase procedure for the recommend function is completed by the driver performing the purchase procedure for the recommend function ("YES" at A59), the in-vehicle system 3 sets the recommend function to an available state (at A60).

On the other hand, when the in-vehicle system 3 shifts to the presentation process for recommend function installed in the vehicle, the in-vehicle system 3 presents the content of the recommend function specified by the recommend function information, for example, through an illustrations, an action, and the like (at A61, corresponding to the recommend function presentation procedure), and the in-vehicle system 3 sets the recommend function in the available state without presenting the price information, the payment information, and the like in the presentation process for recommend function not installed in the vehicle (at A62). When the in-vehicle system 3 sets the recommend function to the available state, the in-vehicle system 3 ends the presentation process for recommend function installed in the vehicle, returns to the recommend function presentation process, and ends the recommend function presentation process.

As described above, according to the first embodiment, the following operational effects can be obtained.

In the function management server 5, the driving data of the driver is acquired from the in-vehicle system 3, the recommend function is specified, and the recommend function information regarding the specified recommend function is distributed to the in-vehicle system 3. When the in-vehicle system 3 receives and acquires the recommend function information distributed from the function management server 5, the recommend function specified by the acquired recommend function information is presented to the driver. By utilizing the driving data of the driver and specifying the function that is effective for driving as the recommend function from the analysis results of the driving data and presenting the recommend function to the driver, the function that is effective for driving can be appropriately presented to the driver, so that the convenience is increased.

In the function management server 5, the driving data of the driver is compared with the driving data of another driver to specify the recommend function. For example, the recommend function can be specified by referring to the driving data of the other driver whose driving operation is similar to the driver.

In the function management server 5, the driving data of the driver is compared with the driving data of another driver at the same place to specify the recommend function. For example, the recommend function can be specified by referring to the driving data of the other driver whose driving operation is similar to the driver at the same place, for example, and the function that is already used by the other driver on the prediction route of the target vehicle can be specified as the recommend function.

In the function management server 5, the recommend function is specified by acquiring the inquiry information of the driver in the automatic conversation service from the mobile information terminal 6, and the recommend function information regarding the specified recommend function is distributed to the in-vehicle system 3. When the in-vehicle system 3 receives and acquires the recommend function information distributed from the function management server 5, the recommend function specified by the acquired recommend function information is presented to the driver. By utilizing the inquiry information of the driver in the automatic conversation service, specifying the function interested for the driver as the recommend function based on the analysis results of the text of the questions posted by the driver, and presenting the specified recommend function to the driver, it is possible to appropriately present the function of interest for the driver, and increase the convenience for the driver.

In the function management server 5, a recommend function is specified by acquiring the comment information of the driver in an online communication service using a website from the mobile information terminal 6, and the recommend function information regarding the specified recommend function is distributed to the in-vehicle system 3. When the in-vehicle system 3 receives and acquires the recommend function information distributed from the function management server 5, the recommend function specified by the acquired recommend function information is presented to the driver. By utilizing the comment information of the driver in the online communication service using the website, specifying the function of interest for the driver based on the analysis results of the text of the comments posted by the driver, and presenting the specified recommend function to the driver, it is possible to appropriately present the function of interest for the driver, and increase the convenience for the driver.

When the function management server 5 determines that the recommend function is not installed in the target vehicle, the function management server 5 distributes the software for the recommend function to the in-vehicle system 3, and the in-vehicle system 3 downloads the software of the recommend function from the function management server 5 and pre-installs the software before the driver determines to use the recommend function. By pre-installing the software of the recommend function before the driver determines to use the recommend function, when the driver determines to use the recommend function, the recommend function can be used immediately, and further the convenience for the driver can be increased.

In the function management server 5, the recommend function is presented to the driver with a time limit. By attaching a deadline for presenting the recommend function to the driver, it is possible to avoid presenting a function whose value has disappeared over time to the driver as a recommend function.

Second Embodiment

A second embodiment will be described below with reference to FIGS. 15 to 17. The second embodiment is configured to perform driving support when the vehicle passes each other by intervening with the driving operation of the driver. As a process performed by the in-vehicle system 3, a driving support process for passing each other will be described.

Figure 15:
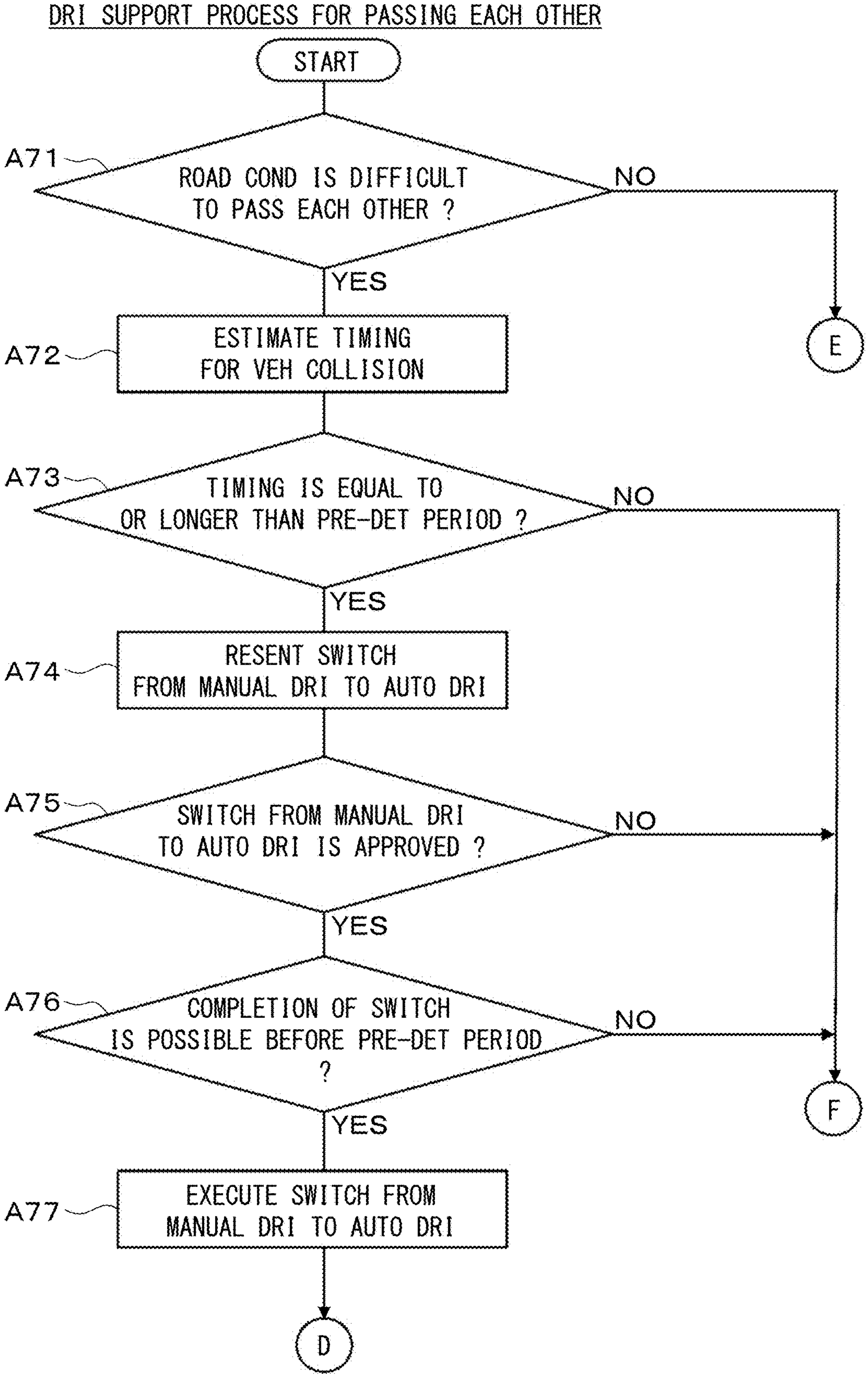
FIG. 15 shows a second embodiment and is a flowchart showing a driving support process when passing each other performed by the in-vehicle system.
Figure 16:
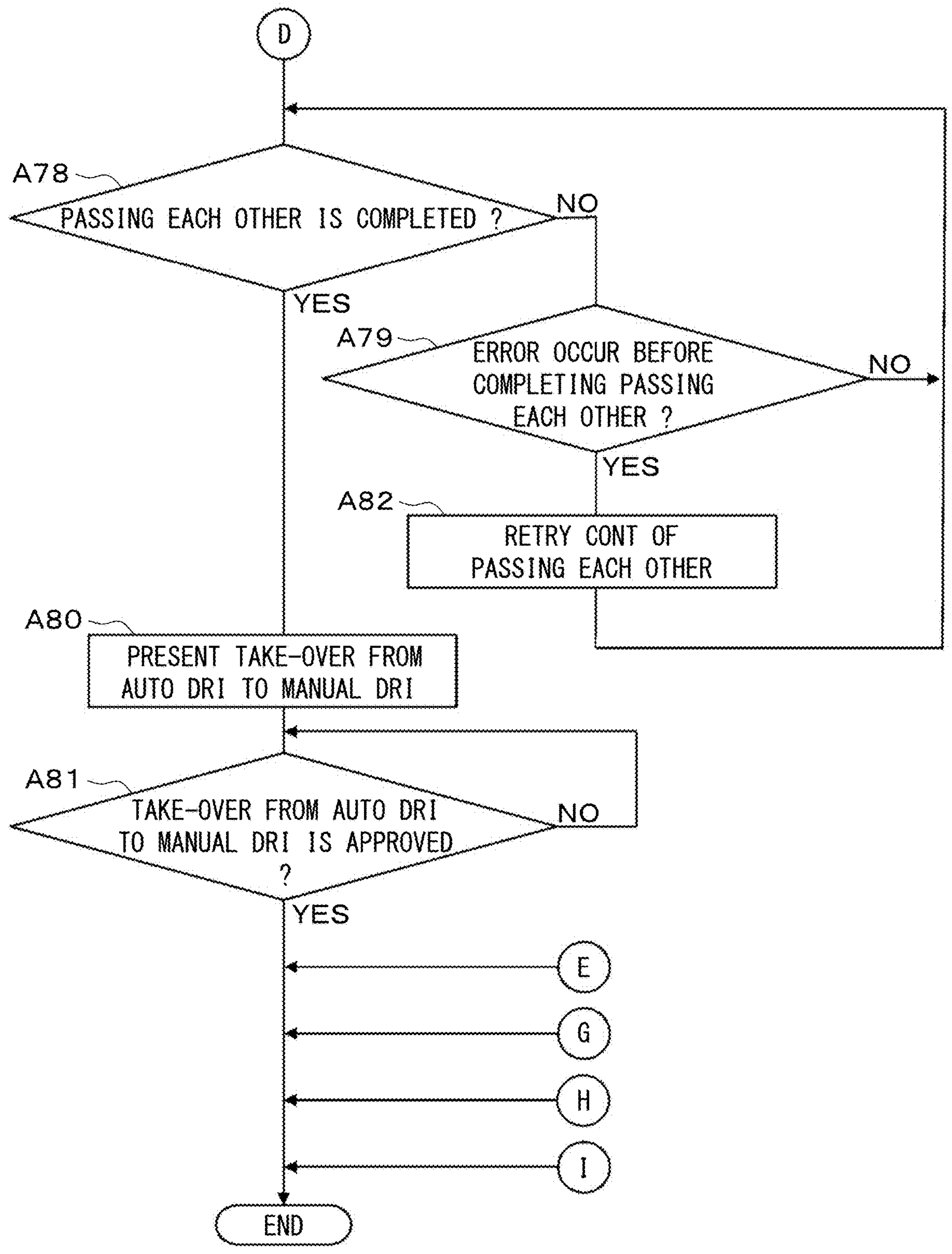
FIG. 16 is a flowchart showing the driving support process when passing each other performed by the in-vehicle system.
Figure 17:
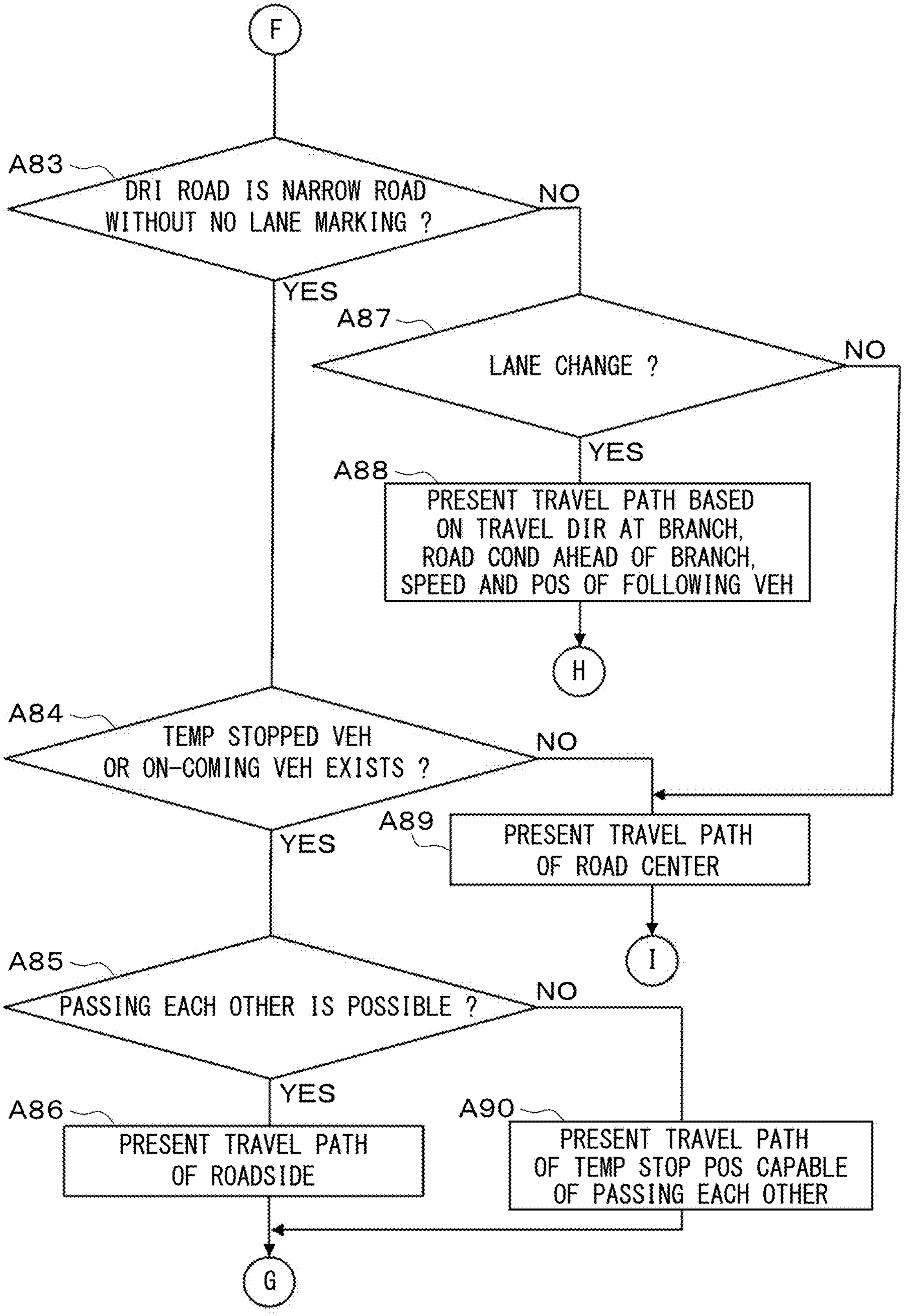
FIG. 17 is a flowchart showing the driving support process when passing each other performed by the in-vehicle system.

(2-1) Driving Support Process for Passing Each Other Performed by the In-Vehicle System 3 (See FIGS. 15 to 17)

When the in-vehicle system 3 determines that it is necessary to intervene in the driving operation of the driver, and the start condition for the driving support process for passing each other is satisfied, the in-vehicle system 3 starts executing the driving support process for passing each other. When the in-vehicle system 3 starts executing the driving support process for passing each other, it determines whether or not the road condition makes it difficult for the vehicle to pass each other (at A71). For example, the in-vehicle system 3 determines that the on which the vehicle is traveling is narrow or it is difficult to secure forward visibility from the vehicle due to an obstruction and the like, and determines that the road condition in which it is difficult for the vehicle to pass each other ("YES" at A71), the in-vehicle system 3 specifies the timing at which the vehicle will collide with another vehicle or the obstacle (at A72), and determines whether the current time is a predetermined period or more (for example, 15 seconds) before the specified timing (at A73).

When the in-vehicle system 3 determines that the current time is a predetermined period or more before the specified timing ("YES" at A73), the in-vehicle system 3 presents the driver with a switch from the manual driving operation to the autonomous driving operation (at A74), and waits for approval of the driver to switch from the manual driving operation to the autonomous driving operation (at A75). In this case, the driver can approve to switch from the manual driving operation to the autonomous driving operation by, for example, operating a button.

When the in-vehicle system 3 determines that the driver has approved to switch from the manual driving operation to the autonomous driving operation ("YES" at A75), the in-vehicle system 3 determines whether the switching from the manual driving operation to the autonomous driving operation can be completed by at least a predetermined period of time (for example, 10 seconds) before the start timing of minimal risk maneuver (hereinafter referred to as Minimal Risk Maneuver, i.e., MRM) (at A76). The MRM is a vehicle control that is performed before reaching a minimal risk condition (i.e., MRC) as a countermeasure when an event that makes it difficult to drive safely occurs. The MRC is a final safe state to which the vehicle ultimately aims to reach in the event that an event occurs that makes it difficult to drive safely due to a functional anomaly in the autonomous driving operation, and the like, and is generally a stop state in a situation where the risk of an accident is sufficiently low.

When the in-vehicle system 3 determines that it is possible to complete the switching from the manual driving operation to the autonomous driving operation at least a predetermined period before the start timing of the MRM ("YES" at A76), the in-vehicle system 3 executes the switching from the manual driving operation to the autonomous driving operation (at A77). When the in-vehicle system 3 executes the switching from the manual driving operation to the autonomous driving operation, the in-vehicle system 3 starts performing the passing each other control and determines whether the passing each other has been completed (at A78) and determines whether an error has occurred before completing passing each other (at A79). When the in-vehicle system 3 determines that the passing each other has been completed without an error occurring ("YES" at A78), the in-vehicle system 3 stops the vehicle in a safe place and presents the driver with the switching from the autonomous driving operation to the manual driving operation (at A80), and waits for approval from the driver to switch from the autonomous driving operation to the manual driving operation (at A81). In this case, the driver can approve to switch from the autonomous driving operation to the manual driving operation by, for example, operating a button.

When the in-vehicle system 3 determines that the driver has approved the switching from the autonomous driving operation to the manual driving operation by operating a button or the like ("YES" at A81), the in-vehicle system 3 ends the driving support process for passing each other. On the other hand, when the in-vehicle system 3 determines that an error has occurred before completing the passing each other ("YES" at A79), the in-vehicle system 3 controls the vehicle to move backward and stops in a safe place, and then retries the control of passing each other (at A82), and then, returns to steps A78 and A79.

When the in-vehicle system 3 determines that the current time is not a predetermined period or more before the specified timing ("NO" at A73), or the in-vehicle system 3 determines that the switching from the manual driving operation to the autonomous driving operation can not be completed by a predetermined period or more before the start timing of the MRM ("NO" at A75), the in-vehicle system 3 determines whether the road on which the vehicle is traveling is a narrow road without a lane marking line (at A83).

When the in-vehicle system 3 determines that the road on which the vehicle is traveling is a narrow road without a lane marking line ("YES" at A83), the in-vehicle system 3 determines whether there is a temporarily stopped vehicle or an oncoming vehicle (at A84). When the in-vehicle system 3 determines that there is a temporarily stopped vehicle or an oncoming vehicle ("YES" at A84), the in-vehicle system 3 determines whether it is possible to pass each other (at A85). When the in-vehicle system 3 determines that it is possible to pass each other ("YES" at A85), the in-vehicle system 3 presents the travel path of the road edge side (at A86), and ends the driving support process for passing each other. That is, by being presented with the travel path of the road edge side, the driver can perform a driving operation in accordance with the presented travel path of the road edge side.

When the in-vehicle system 3 determines that the road on which the vehicle is traveling is not a narrow road without a lane marking line ("NO" at A83), the in-vehicle system 3 determines whether or not it is necessary to change a lane (at A87). When the in-vehicle system 3 determines that it is necessary to change a lane ("YES" at A87), the in-vehicle system 3 presents a travel path based on the direction of travel at a branch, the road condition at the branch destination, and the speed and the position of the following vehicle (at A88), and ends the driving support process for passing each other. That is, the driver is presented with a travel path based on the direction of travel at the branch, the road condition at the branch destination, and the speed and the position of the following vehicle, so that the driver can perform a driving operation in accordance with the presented travel path.

When the in-vehicle system 3 determines that there is no temporarily stopped vehicle or oncoming vehicle ("NO" at A84), or the in-vehicle system 3 determines that it is not necessary to change a lane ("NO" at A87), the in-vehicle system 3 presents a travel path in the center of the road (at A89) and ends the driving support process for passing each other. That is, by being presented with the travel path in the center of the road, the driver can perform a driving operation in accordance with the presented travel path in the center of the road. When the in-vehicle system 3 determines that it is not possible to pass each other ("NO" at A85), the in-vehicle system 3 presents a travel path to a temporary stop position where the passing each other is possible (at A90), and ends the driving support process for passing each other. That is, by being presented with a driving path to a temporary stop position where the driver can pass each other, the driver can perform a driving operation to reach the temporary stop position in accordance with the presented travel path.

As described above, according to the second embodiment, the following operational effects can be obtained.

The in-vehicle system 3 intervenes in the driving operation of the driver to provide the driving support for passing each other. Thus, it is possible to appropriately support the driving operation when passing each other.

Third Embodiment

A third embodiment will be described below with reference to FIGS. 18 to 19. In the third embodiment, after presenting the recommend function to the driver in the in-vehicle system 3, the in-vehicle system 3 inquires the driver about the degree of satisfaction with the presented recommend function, and the function management server 5 collects the response result from the driver regarding the degree of satisfaction with the recommend function, and specifies the recommend function based on the response result of satisfaction. A satisfaction level inquiry process will be described as a process performed by the in-vehicle system 3, and a recommend function specifying process based on a satisfaction level will be described as a process performed by the function management server 5.

Figure 18:
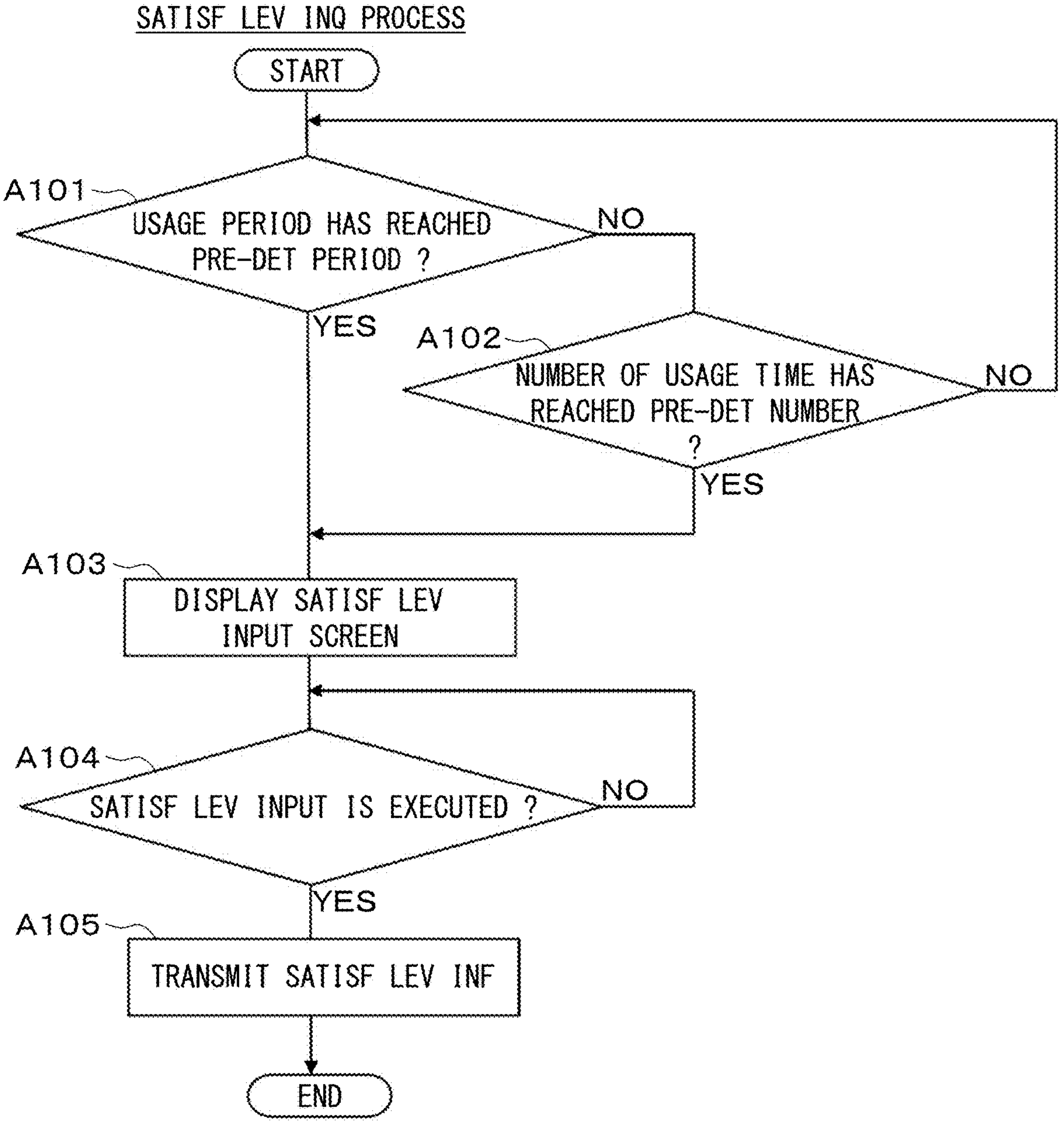
FIG. 18 is a flowchart showing a satisfaction level inquiry process performed by the in-vehicle system according to the third embodiment.

(3-1) Satisfaction Level Inquiry Process Performed by the In-Vehicle System 3 (See FIG. 18)

The in-vehicle system 3 starts executing the satisfaction level inquiry process when the start condition for the satisfaction level inquiry process is satisfied. When the in-vehicle system 3 starts executing the satisfaction inquiry process, the in-vehicle system 3 sets the recommend function to the available state as described in the first embodiment, and then determines whether the usage period of the recommend function has reached a predetermined period after setting the recommend function to the available (at A101), and the in-vehicle system 3 also determines whether the number of usage times of the recommend function has reached a predetermined number of times after setting the recommend function to the available state (at A102).

In this case, the predetermined period is, for example, a period during which the driver can evaluate the degree of satisfaction with the recommend function, and if the driver uses the recommend function frequently, the predetermined period may be a relatively short period, and if the driver only uses the recommend function infrequently, the predetermined period may be a relatively long period. The predetermined number of times is, for example, the number of times that the driver can evaluate the degree of satisfaction with the recommend function, and if the usage period per one usage time of the recommend function is relatively short, the predetermined number of times may be a relatively large number of times, and if the usage period per one usage time of the recommend function is relatively long, the predetermined number of times may be a relatively small number of times.

When the in-vehicle system 3 determines that the usage period of the recommend function after setting the recommend function to the available state has reached a predetermined period ("YES" at A101), or the in-vehicle system 3 determines that the number of usage times of the recommend function has reached a predetermined number of times after setting the recommend function to the available state ("YES" at A102), the in-vehicle system 3 controls a center display, a meter display, and the like to display a satisfaction level input screen for the recommend function (at A103), and waits for an operation input from the driver (at A104). The satisfaction level input screen is, for example, a screen on which the driver can evaluate the recommend function and input the level of satisfaction in five levels.

When the in-vehicle system 3 determines that the driver has input the satisfaction level ("YES" at A104), the in-vehicle system 3 distributes the satisfaction information regarding the input satisfaction level to the function management server 5 (at A105), and ends the satisfaction inquiry process. Here, when the mobile information terminal 6 is in a state where data communication is possible with the in-vehicle system 3, the satisfaction level input screen may be displayed on the mobile information terminal 6, and the driver may input the satisfaction level using the mobile information terminal 6. Alternatively, instead of the driver manually inputting the satisfaction level, the driver may use a voice assistant function to input the satisfaction level by voice. Alternatively, the in-vehicle system 3 may continue to use the recommend function for which the driver inputs an operation with a relatively high satisfaction level, but the in-vehicle system 3 may stop using the recommend function for which the driver inputs an operation with a relatively low satisfaction level under a condition that the user has approved to stop using the recommend function.

Figure 19:
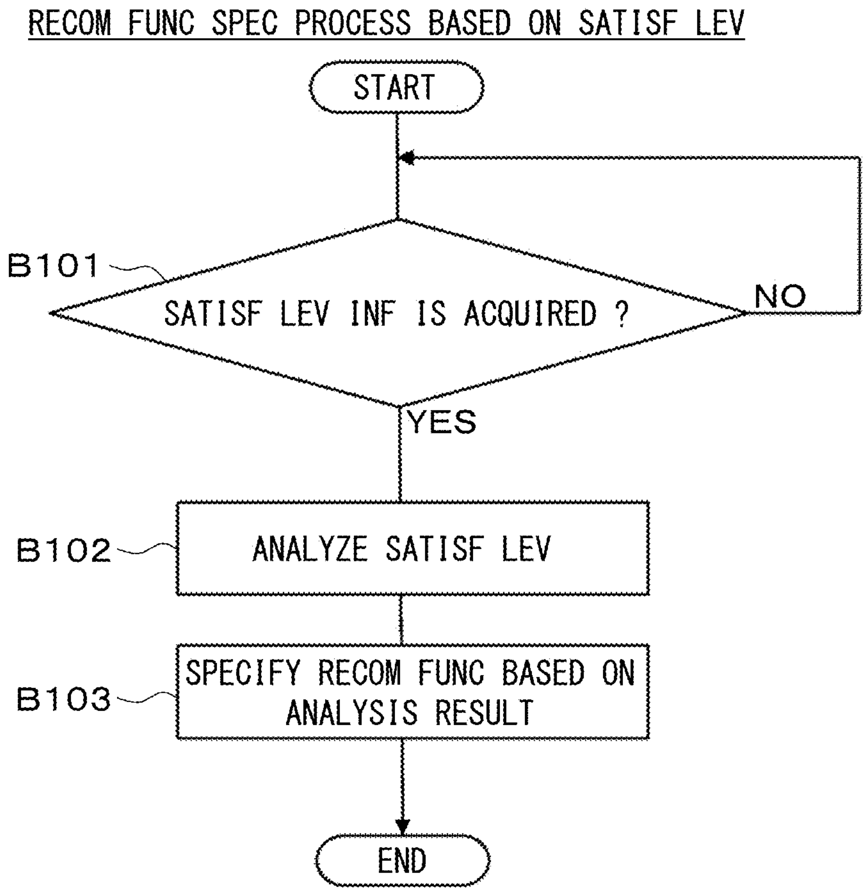
FIG. 19 is a flowchart showing a recommend function specifying process based on a satisfaction level performed by the function management server.

(3-2) Recommend Function Specifying Process Based on Satisfaction Level Performed by the Function Management Server 5 (See FIG. 19)

The function management server 5 starts executing the recommend function specifying process based on the satisfaction level when the start condition for the recommend function specifying process based on the satisfaction level is satisfied. When the function management server 5 starts executing the recommend function specifying process based on the satisfaction level, the function management server 5 determines whether or not the satisfaction level information transmitted from the in-vehicle system 3 has been received and acquired (at B101). When the function management server 5 determines that the satisfaction level information transmitted from the in-vehicle system 3 has been received and acquired ("YES" at B102), the function management server 5 analyzes the satisfaction level specified by the acquired satisfaction level information (at B103), and specifies the recommend function based on the analysis result (at B94), and ends the recommend function specifying process based on satisfaction level.

That is, the function management server 5 specifies the recommend function by considering the degree of satisfaction when specifying the recommend function based on at least one of the driving data of the driver, the inquiry information of the driver based on the usage of the automatic conversation service, and the comment information of the driver based on the usage of the online communication service using the website as described in the first embodiment. For example, the function management server 5 prioritizes a function that has been evaluated as having a high satisfaction level by another driver of the same model vehicle or the same type vehicle, and specifies the function that has a relatively high satisfaction level as the recommend function. But, the function management server 5 does not specify a function that has been evaluated as having a relatively low satisfaction level as the recommend function.

Here, the configuration in which the usage period and the number of usage times are managed by the in-vehicle system 3 has been exemplified above, a configuration in which the usage period and the number of usage times may is managed by the function management server 5 may also be provided. That is, the in-vehicle system 3 transmits the usage period and the number of usage times to the function management server 5, and the function management server 5 manages the usage period and the number of usage times for each in-vehicle system 3, and transmits the satisfaction evaluation instruction to the in-vehicle system 3 whose usage period has reached a predetermined period or to the in-vehicle system 3 whose number of usage times has reached a predetermined number of times. The in-vehicle system 3 may execute the satisfaction level inquiry process upon receiving the satisfaction level evaluation instruction transmitted from the function management server 5.

As described above, according to the third embodiment, the following operational effects can be obtained.

In the in-vehicle system 3, after presenting the recommend function to the driver, the in-vehicle system 3 inquires the driver about the satisfaction degree of the presented recommend function, and the function management server 5 collects the response result from the driver regarding the satisfaction degree of the recommend function. By specifying the recommend function that reflect the satisfaction evaluation, the recommend function that reflects the satisfaction evaluation can be presented to the driver.

Fourth Embodiment

A fourth embodiment will be described below with reference to FIGS. 20 to 21. In the configuration of the fourth embodiment, the in-vehicle system 3 acquires the usage history of the function and the behavior history of the driver, transmits the acquired usage history of the function and the acquired behavior history to the function management server 5, and the function management server 5 specifies the recommend function based on the usage history of the function and the behavior history of the driver. A history acquisition process will be described as a process performed by the in-vehicle system 3, and a recommend function specifying process will be described as a process performed by the function management server 5.

Figure 20:
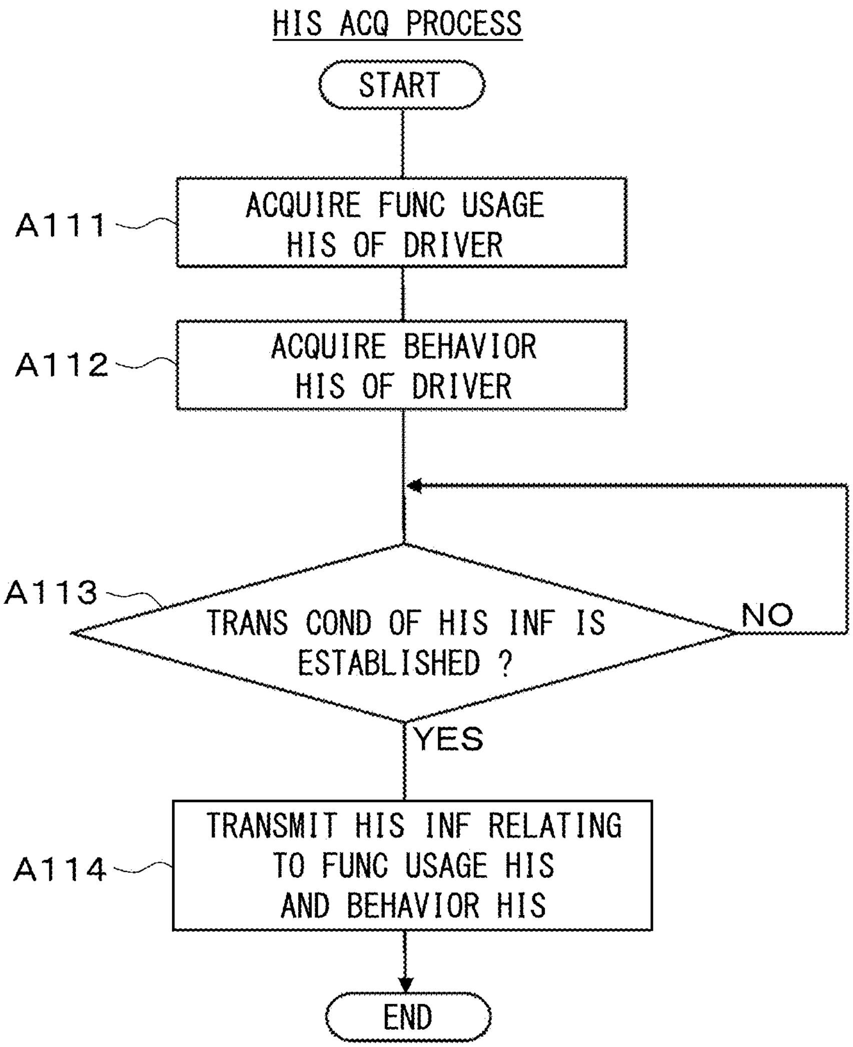
FIG. 20 is a flowchart showing a history acquisition process performed by the in-vehicle system according to the fourth embodiment.

(4-1) History Acquisition Process Performed by the In-Vehicle System 3 (See FIG. 20)

The in-vehicle system 3 starts executing the history acquisition process when the start condition for the history acquisition process is satisfied. When the in-vehicle system 3 starts executing the history acquisition process, the in-vehicle system 3 acquires the usage history of the function of the driver (at A111), acquires the behavior history of the driver (at A112), and stores the acquired usage history of the function and the behavior history in the data storage area (at A113). The in-vehicle system 3 determines whether the transmission condition of the history is satisfied (at A114), and when the in-vehicle system 3 determines that the transmission condition of the history is satisfied (W"YES" at A114), the in-vehicle system 3 transmits the history information related to the usage history of the function and the behavior history stored in the data storage area to the function management server 5 (at A115), and executes the history acquisition process.

Figure 21:
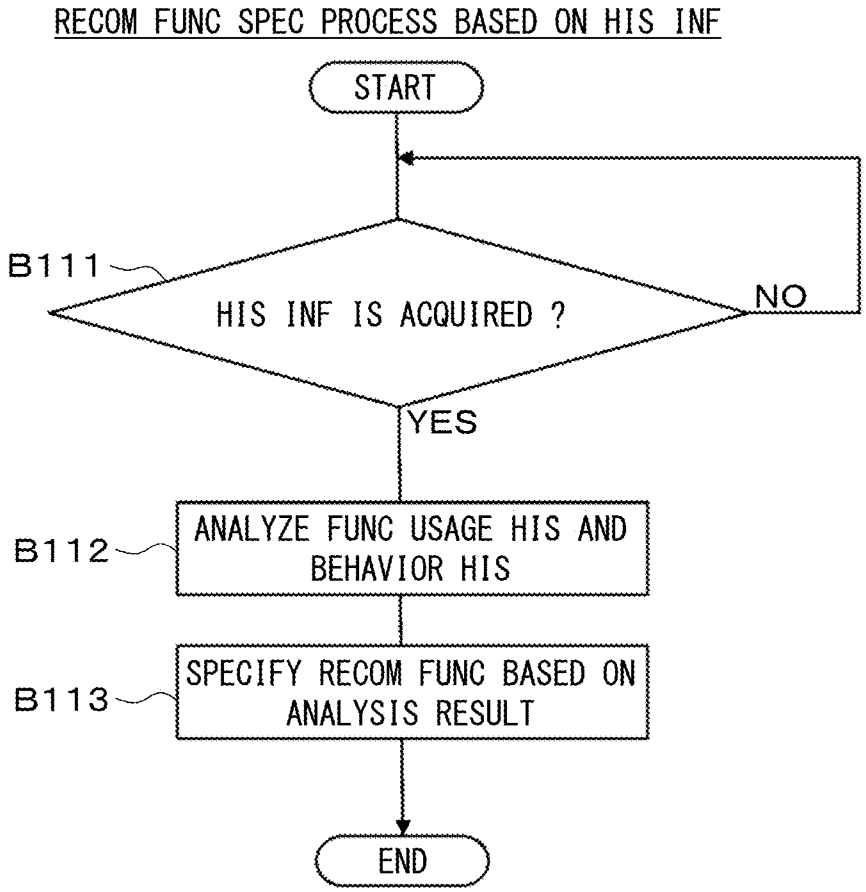
FIG. 21 is a flowchart showing a recommend function specifying process based on a history performed by the function management server.

(4-2) Recommend Function Specifying Process Based on History Performed by the Function Management Server 5 (See FIG. 21)

When the function management server 5 starts executing the recommend function specifying process based on the history, the function management server 5 determines whether or not the history information transmitted from the in-vehicle system 3 has been received and acquired (at B111). When the function management server 5 determines that the history information transmitted from the in-vehicle system 3 has been received and acquired ("YES" at B111), the function management server 5 analyzes the usage history of the function and the behavior history specified by the acquired history information (at B112), specifies a recommend function based on the analysis result (at B113), and ends the recommend function specifying process based on the history.

The in-vehicle system 3 stores, for example, the feature that the driver tried to activate an adaptive cruise control (hereinafter referred to as ACC) function in the past but the driver gave up to activate the ACC without activating the ACC, as an usage history of the function. When the driver stores a plan as the behavior history such that the driver plans to drive on an automotive road according to the route search using a navigation application, the function management server 5 specifies the ADAS function including the ACC function as a recommend function.

Although the configuration above has been exemplified in which the usage history of the function and the behavior history of the driver are managed by the in-vehicle system 3, a configuration in which the usage history of the function and the behavior history of the driver is managed by the function management server 5 may also be provided. That is, the in-vehicle system 3 may transmit the usage history of the function and the behavior history of the driver to the function management server 5, and the function management server 5 may manage the usage history of the function and the behavior history of the driver for each in-vehicle system 3. Alternatively, the behavior history of the driver may be managed using the schedule registration function of the mobile information terminal 6 in combination.

As described above, according to the fourth embodiment, the following operational effects can be obtained.

The in-vehicle system 3 acquires the usage history of the function and the behavior history of the driver, transmits the acquired usage history of the function and the acquired behavior history of the driver to the function management server 5, and the function management server 5 specifies the recommend function based on the usage history of the function and the behavior history of the driver, and distributes the recommend function information regarding the specified recommend function to the in-vehicle system 3. By specifying the recommend function that reflects the usage history of the function and the behavior history of the driver, the recommend function that reflects the usage history of the function and the behavior history of the driver can be presented to the driver.

Other Embodiments

Although the present disclosure has been described in accordance with the examples, it is understood that the present disclosure is not limited to such examples or structures. The present disclosure includes various modification examples and equivalents thereof. Additionally, various combinations and configurations, as well as other combinations and configurations including more, less, or only a single element, are within the scope and spirit of the present disclosure.

The control unit and the method thereof described in the present disclosure may be implemented by a dedicated computer provided by configuring a processor and a memory programmed to execute one or more functions embodied by a computer program. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured with one or more hardware logic circuits. The computer program may be stored in a computer-readable non-transition tangible recording medium as an instruction executed by a computer.

The data communication system 1 may cooperate with a driving diagnosis server that performs driving diagnosis based on the driving data of the driver, a point function management server that manages points and gives the points to the driver based on the driving diagnosis result, and the like.

A data communication system may include at least one of (i) a circuit and (ii) a processor having a memory storing computer program code. The at least one of the circuit and the processor having the memory is configured to cause the data communication system to: a function management server that manages a function related to a vehicle; and an in-vehicle system mounted in the vehicle. The function management server and the in-vehicle system perform data communication with each other. The function management server acquires a driving data of a driver of the vehicle from the in-vehicle system, specifies a recommend function, and distributes recommend function information related to a specified recommend function to the in-vehicle system. Upon receiving the recommend function information distributed from the function management server, the in-vehicle system presents the recommend function specified by received recommend function information to the driver.

A data communication system may include at least one of (i) a circuit and (ii) a processor having a memory storing computer program code. The at least one of the circuit and the processor having the memory is configured to cause the data communication system to: the function management server that manages a function related to a vehicle; and the in-vehicle system mounted in the vehicle. The function management server and the in-vehicle system perform data communication with each other. The function management server acquires inquiry information of a driver of the vehicle in an automatic conversation service, specifies a recommend function, and distributes recommend function information related to a specified recommend function to the in-vehicle system. Upon receiving the recommend function information distributed from the function management server, the in-vehicle system presents the recommend function specified by received recommend function information to the driver.

A data communication system may include at least one of (i) a circuit and (ii) a processor having a memory storing computer program code. The at least one of the circuit and the processor having the memory is configured to cause the data communication system to: the function management server that manages a function related to a vehicle; and the in-vehicle system mounted in the vehicle. The function management server and the in-vehicle system perform data communication with each other. The function management server acquires comment information of a driver of the vehicle in an online communication service using a website, specifies a recommend function, and distributes recommend function information related to a specified recommend function to the in-vehicle system Upon receiving the recommend function information distributed from the function management server, the in-vehicle system presents the recommend function specified by received recommend function information to the driver.

A function management server may manage a function related to a vehicle and performs data communication with an in-vehicle system which presents a recommend function specified by recommend function information when the in-vehicle system receives the recommend function information distributed from the function management server. The function management server may include at least one of (i) a circuit and (ii) a processor having a memory storing computer program code. The at least one of the circuit and the processor having the memory is configured to cause the function management server to: the driving data acquisition unit that acquires driving data of a driver of the vehicle from the in-vehicle system; the first recommend function specifying unit that specifies the recommend function based on the driving data of the driver; and the information distribution unit that distributes the recommend function information related to the recommend function to the in-vehicle system.

A function management server may manages a function related to a vehicle and performs data communication with an in-vehicle system which presents a recommend function specified by recommend function information when the in-vehicle system receives the recommend function information distributed from the function management server. The function management server may include at least one of (i) a circuit and (ii) a processor having a memory storing computer program code. The at least one of the circuit and the processor having the memory is configured to cause the function management server to: the inquiry information acquisition unit that acquires inquiry information of a driver of the vehicle in an automatic conversation service; the second recommend function specifying unit that specifies the recommend function based on the inquiry information of the driver; and the information distribution unit that distributes the recommend function information related to the recommend function to the in-vehicle system.

A function management server may manages a function related to a vehicle and performs data communication with an in-vehicle system which presents a recommend function specified by recommend function information when the in-vehicle system receives the recommend function information distributed from the function management server. The function management server may include at least one of (i) a circuit and (ii) a processor having a memory storing computer program code. The at least one of the circuit and the processor having the memory is configured to cause the function management server to: the comment information acquisition unit that acquires comment information of a driver of the vehicle in an online communication service using a website; the third recommend function specifying unit that specifies the recommend function based on the comment information of the driver; and the information distribution unit that distributes the recommend function information related to the recommend function to the in-vehicle system.

An in-vehicle system may perform data communication with a function management server which specifies a recommend function based on at least one of the driving data of a driver of a vehicle, inquiry information of the driver in an automatic conversation service, and comment information of the driver in an online communication service using a website, and distributes recommend function information related to a specified recommend function to the in-vehicle system. The in-vehicle system may include at least one of (i) a circuit and (ii) a processor having a memory storing computer program code. The at least one of the circuit and the processor having the memory is configured to cause the in-vehicle system to: the recommend function presentation unit that presents the recommend function specified by received recommend function information to the driver upon receiving the recommend function information distributed from the function management server.

A data communication system may include: a function management server that manages a function related to a vehicle; and an in-vehicle system mounted in the vehicle. The function management server and the in-vehicle system perform data communication with each other. The function management server acquires a driving data of a driver of the vehicle from the in-vehicle system, specifies a recommend function, and distributes recommend function information related to a specified recommend function to the in-vehicle system. Upon receiving the recommend function information distributed from the function management server, the in-vehicle system presents the recommend function specified by received recommend function information to the driver. The function management server determines whether the recommend function is installed in a target vehicle, and distributes a software of the recommend function to the in-vehicle system when the function management server determines that the recommend function is not installed in the target vehicle. The in-vehicle system downloads and pre-installs the software of the recommend function from the function management server before the driver determines to use the recommend function.

In the data communication system, the function management server may further specify the recommend function by comparing the driving data of the driver acquired from the in-vehicle system with a driving data of another driver. Further, the function management server may further specify the recommend function by comparing the driving data of the driver acquired from the in-vehicle system with the driving data of the another driver at a same place.

In the data communication system, the in-vehicle system may further download and pre-install the software of the recommend function from the function management server when presenting the recommend function to the driver. Further, the in-vehicle system may further presents the recommend function to the driver for a limited time.

In the data communication system, the in-vehicle system may further intervene in a driving operation of the driver when it is necessary to intervene in the driving operation of the driver. Further, the in-vehicle system may further execute a driving support when the vehicle passes each other as an intervention in the driving operation of the driver.

In the data communication system, the in-vehicle system may further inquire of the driver related to a satisfaction level of the driver with a presented recommend function after presenting the recommend function to the driver; and the function management server may further collect a response result related to the satisfaction level with the presented recommend function from driver.

In the data communication system, the in-vehicle system may further acquire an usage history of a function and a behavior history; and the function management server may further specify the recommend function based on the usage history of the function and the behavior history of the driver, and distributes recommend function information related to a specified recommend function to the in-vehicle system.

A data communication system may include: a function management server that manages a function related to a vehicle; and an in-vehicle system mounted in the vehicle The function management server and the in-vehicle system perform data communication with each other. The function management server acquires inquiry information of a driver of the vehicle in an automatic conversation service, specifies a recommend function, and distributes recommend function information related to a specified recommend function to the in-vehicle system. Upon receiving the recommend function information distributed from the function management server, the in-vehicle system presents the recommend function specified by received recommend function information to the driver. The function management server determines whether the recommend function is installed in a target vehicle, and distributes a software of the recommend function to the in-vehicle system when the function management server determines that the recommend function is not installed in the target vehicle. The in-vehicle system downloads and pre-installs the software of the recommend function from the function management server before the driver determines to use the recommend function.

A function management server may manage a function related to a vehicle and performs data communication with an in-vehicle system which presents a recommend function specified by recommend function information when the in-vehicle system receives the recommend function information distributed from the function management server. The function management server may include: a driving data acquisition unit that acquires driving data of a driver of the vehicle from the in-vehicle system; a first recommend function specifying unit that specifies the recommend function based on the driving data of the driver; and an information distribution unit that distributes the recommend function information related to the recommend function to the in-vehicle system. The function management server determines whether the recommend function is installed in a target vehicle, and distributes a software of the recommend function to the in-vehicle system when the function management server determines that the recommend function is not installed in the target vehicle. The in-vehicle system downloads and pre-installs the software of the recommend function from the function management server before the driver determines to use the recommend function.

A function management server may manages a function related to a vehicle and performs data communication with an in-vehicle system which presents a recommend function specified by recommend function information when the in-vehicle system receives the recommend function information distributed from the function management server. The function management server may include: an inquiry information acquisition unit that acquires inquiry information of a driver of the vehicle in an automatic conversation service; a second recommend function specifying unit that specifies the recommend function based on the inquiry information of the driver; and an information distribution unit that distributes the recommend function information related to the recommend function to the in-vehicle system. The function management server determines whether the recommend function is installed in a target vehicle, and distributes a software of the recommend function to the in-vehicle system when the function management server determines that the recommend function is not installed in the target vehicle. The in-vehicle system downloads and pre-installs the software of the recommend function from the function management server before the driver determines to use the recommend function.

An in-vehicle system may perform data communication with a function management server which specifies a recommend function based on at least one of the driving data of a driver of a vehicle, inquiry information of the driver in an automatic conversation service, and comment information of the driver in an online communication service using a website, and distributes recommend function information related to a specified recommend function to the in-vehicle system. The in-vehicle system may include: a recommend function presentation unit that presents the recommend function specified by received recommend function information to the driver upon receiving the recommend function information distributed from the function management server. The function management server determines whether the recommend function is installed in a target vehicle, and distributes a software of the recommend function to the in-vehicle system when the function management server determines that the recommend function is not installed in the target vehicle. The in-vehicle system downloads and pre-installs the software of the recommend function from the function management server before the driver determines to use the recommend function.

A recommend function distribution program may cause a function management server that manages a function related to a vehicle and performs data communication with an in-vehicle system which presents a recommend function specified by recommend function information when the in-vehicle system receives the recommend function information distributed from the function management server, to execute: a driving data acquisition procedure for acquiring driving data of a driver of the vehicle from the in-vehicle system; a first recommend function specifying procedure for specifying the recommend function based on the driving data of the driver; and an information distribution procedure for distributing the recommend function information related to the recommend function to the in-vehicle system. The function management server determines whether the recommend function is installed in a target vehicle, and distributes a software of the recommend function to the in-vehicle system when the function management server determines that the recommend function is not installed in the target vehicle. The in-vehicle system downloads and pre-installs the software of the recommend function from the function management server before the driver determines to use the recommend function.

A recommend function distribution program may cause a function management server that manages a function related to a vehicle and performs data communication with an in-vehicle system which presents a recommend function specified by recommend function information when the in-vehicle system receives the recommend function information distributed from the function management server, to execute: an inquiry information acquisition procedure for acquiring inquiry information of a driver of the vehicle in an automatic conversation service; a second recommend function specifying procedure for specifying the recommend function based on the inquiry information of the driver; and an information distribution procedure for distributing the recommend function information related to the recommend function to the in-vehicle system. The function management server determines whether the recommend function is installed in a target vehicle, and distributes a software of the recommend function to the in-vehicle system when the function management server determines that the recommend function is not installed in the target vehicle. The in-vehicle system downloads and pre-installs the software of the recommend function from the function management server before the driver determines to use the recommend function.

A recommend function presentation program may cause an in-vehicle system that performs data communication with a function management server which specifies a recommend function based on at least one of the driving data of a driver of a vehicle, inquiry information of the driver in an automatic conversation service, and comment information of the driver in an online communication service using a website, and distributes recommend function information related to a specified recommend function to the in-vehicle system, to execute: a recommend function presentation procedure for presenting the recommend function specified by received recommend function information to the driver upon receiving the recommend function information distributed from the function management server. The function management server determines whether the recommend function is installed in a target vehicle, and distributes a software of the recommend function to the in-vehicle system when the function management server determines that the recommend function is not installed in the target vehicle. The in-vehicle system downloads and pre-installs the software of the recommend function from the function management server before the driver determines to use the recommend function.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause a data communication system, a function management server, or an in-vehicle system to perform functions" should be understood that (i) only the circuit can cause a data communication system, a function management server, or an in-vehicle system to perform all the functions, (ii) only the processor can cause a data communication system, a function management server, or an in-vehicle system to perform all the functions, or (iii) the circuit can cause a data communication system, a function management server, or an in-vehicle system to perform at least one of the functions and the processor can cause a data communication system, a function management server, or an in-vehicle system to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as A1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data communication system comprising:

a function management server that manages a function related to a vehicle; and an in-vehicle system mounted in the vehicle, wherein:

the function management server and the in-vehicle system perform data communication with each other;

the function management server acquires a driving data of a driver of the vehicle from the in-vehicle system, specifies a recommend function by analyzing a driving technique of the driver based on an acquired driving data, and distributes recommend function information related to a specified recommend function to the in-vehicle system;

upon receiving the recommend function information distributed from the function management server, the in-vehicle system presents the recommend function specified by the received recommend function information to the driver;

the recommend function is executable by the in-vehicle system mounted on the vehicle;

software of the recommend function is downloadable from the function management server; and the recommend function includes a plurality of recommend functions that include a lane keeping assist function and a lane tracing assist function.

2. The data communication system according to claim 1, wherein:

the function management server specifies the recommend function by comparing the driving data of the driver acquired from the in-vehicle system with a driving data of another driver.

3. The data communication system according to claim 2, wherein:

the function management server specifies the recommend function by comparing the driving data of the driver acquired from the in-vehicle system with the driving data of the another driver at a same place.

4. The data communication system according to claim 1, wherein:

the function management server determines whether the recommend function is installed in a target vehicle, and distributes the software of the recommend function to the in-vehicle system when the function management server determines that the recommend function is not installed in the target vehicle; and the in-vehicle system downloads and pre-installs the software of the recommend function from the function management server before the driver determines to use the recommend function.

5. The data communication system according to claim 4, wherein:

the in-vehicle system downloads and pre-installs the software of the recommend function from the function management server when presenting the recommend function to the driver.

6. The data communication system according to claim 5 wherein:

the in-vehicle system presents the recommend function to the driver for a limited time.

7. The data communication system according to claim 1, wherein:

the in-vehicle system intervenes in a driving operation of the driver when it is necessary to intervene in the driving operation of the driver.

8. The data communication system according to claim 7, wherein:

the in-vehicle system executes a driving support when the vehicle passes another vehicle as an intervention in the driving operation of the driver.

9. The data communication system according to claim 1, wherein:

the in-vehicle system inquires of the driver related to a satisfaction level of the driver with a presented recommend function after presenting the recommend function to the driver; and the function management server collects a response result related to the satisfaction level with the presented recommend function from driver.

10. The data communication system according to claim 1, wherein:

the in-vehicle system acquires a usage history of a function and a behavior history; and the function management server specifies the recommend function based on the usage history of the function and the behavior history of the driver, and distributes recommend function information related to a specified recommend function to the in-vehicle system.

11. A data communication system comprising:

a function management server that manages a function related to a vehicle; and an in-vehicle system mounted in the vehicle, wherein:

the function management server and the in-vehicle system perform data communication with each other;

the function management server acquires inquiry information of a driver of the vehicle in an automatic conversation service, specifies a recommend function, and distributes recommend function information related to a specified recommend function to the in-vehicle system;

upon receiving the recommend function information distributed from the function management server, the in-vehicle system presents the recommend function specified by received recommend function information to the driver;

the recommend function is executable by the in-vehicle system mounted on the vehicle;

software of the recommend function is downloadable from the function management server; and the recommend function includes a plurality of recommend functions that include a lane keeping assist function and a lane tracing assist function.

12. A data communication system comprising:

a function management server that manages a function related to a vehicle; and an in-vehicle system mounted in the vehicle, wherein:

the function management server and the in-vehicle system perform data communication with each other;

the function management server acquires comment information of a driver of the vehicle in an online communication service using a website, specifies a recommend function, and distributes recommend function information related to a specified recommend function to the in-vehicle system;

upon receiving the recommend function information distributed from the function management server, the in-vehicle system presents the recommend function specified by received recommend function information to the driver;

the recommend function is executable by the in-vehicle system mounted on the vehicle;

software of the recommend function is downloadable from the function management server; and the recommend function includes a plurality of recommend functions that include a lane keeping assist function and a lane tracing assist function.

13. A function management server that manages a function related to a vehicle and performs data communication with an in-vehicle system which presents a recommend function specified by recommend function information when the in-vehicle system receives the recommend function information distributed from the function management server, the function management server comprising:

a driving data acquisition unit that acquires driving data of a driver of the vehicle from the in-vehicle system;

a first recommend function specifying unit that specifies the recommend function by analyzing a driving technique of the driver based on the driving data of the driver; and an information distribution unit that distributes the recommend function information related to the recommend function to the in-vehicle system;

wherein:

the recommend function is executable by the in-vehicle system, which is mounted on the vehicle;

software of the recommend function is downloadable from the function management server; and the recommend function includes a plurality of recommend functions that include a lane keeping assist function and a lane tracing assist function.

14. A function management server that manages a function related to a vehicle and performs data communication with an in-vehicle system which presents a recommend function specified by recommend function information when the in-vehicle system receives the recommend function information distributed from the function management server, the function management server comprising:

an inquiry information acquisition unit that acquires inquiry information of a driver of the vehicle in an automatic conversation service;

a second recommend function specifying unit that specifies the recommend function based on the inquiry information of the driver; and an information distribution unit that distributes the recommend function information related to the recommend function to the in-vehicle system;

wherein:

the recommend function is executable by the in-vehicle system, which is mounted on the vehicle;

software of the recommend function is downloadable from the function management server; and the recommend function includes a plurality of recommend functions that include a lane keeping assist function and a lane tracing assist function.

15. A function management server that manages a function related to a vehicle and performs data communication with an in-vehicle system which presents a recommend function specified by recommend function information when the in-vehicle system receives the recommend function information distributed from the function management server, the function management server comprising:

a comment information acquisition unit that acquires comment information of a driver of the vehicle in an online communication service using a website;

a third recommend function specifying unit that specifies the recommend function based on the comment information of the driver; and an information distribution unit that distributes the recommend function information related to the recommend function to the in-vehicle system;

wherein:

the recommend function is executable by the in-vehicle system, which is mounted on the vehicle;

software of the recommend function is downloadable from the function management server; and the recommend function includes a plurality of recommend functions that include a lane keeping assist function and a lane tracing assist function.

16. An in-vehicle system that performs data communication with a function management server which specifies a recommend function based on at least one of a driving technique of a driver of a vehicle analyzed based on a driving data of the driver of the vehicle, inquiry information of the driver in an automatic conversation service, and comment information of the driver in an online communication service using a website, and distributes recommend function information related to a specified recommend function to the in-vehicle system, the in-vehicle system comprising:

a recommend function presentation unit that presents the recommend function specified by received recommend function information to the driver upon receiving the recommend function information distributed from the function management server;

wherein:

the recommend function is executable by the in-vehicle system, which is mounted on the vehicle;

software of the recommend function is downloadable from the function management server; and the recommend function includes a plurality of recommend functions that include a lane keeping assist function and a lane tracing assist function.

17. A non-transitory computer readable storage medium comprising instructions for execution by a computer, the instructions for causing a function management server that manages a function related to a vehicle and performs data communication with an in-vehicle system which presents a recommend function specified by recommend function information when the in-vehicle system receives the recommend function information distributed from the function management server, to execute:

a driving data acquisition procedure for acquiring driving data of a driver of the vehicle from the in-vehicle system;

a first recommend function specifying procedure for specifying the recommend function by analyzing a driving technique of the driver based on the driving data of the driver; and an information distribution procedure for distributing the recommend function information related to the recommend function to the in-vehicle system;

wherein:

the recommend function is executable by the in-vehicle system, which is mounted on the vehicle;

software of the recommend function is downloadable from the function management server; and the recommend function includes a plurality of recommend functions that include a lane keeping assist function and a lane tracing assist function.

18. A non-transitory computer readable storage medium comprising instructions for execution by a computer, the instructions for causing a function management server that manages a function related to a vehicle and performs data communication with an in-vehicle system which presents a recommend function specified by recommend function information when the in-vehicle system receives the recommend function information distributed from the function management server, to execute:

an inquiry information acquisition procedure for acquiring inquiry information of a driver of the vehicle in an automatic conversation service;

a second recommend function specifying procedure for specifying the recommend function based on the inquiry information of the driver; and an information distribution procedure for distributing the recommend function information related to the recommend function to the in-vehicle system;

wherein:

the recommend function is executable by the in-vehicle system, which is mounted on the vehicle;

software of the recommend function is downloadable from the function management server; and the recommend function includes a plurality of recommend functions that include a lane keeping assist function and a lane tracing assist function.

19. A non-transitory computer readable storage medium comprising instructions for execution by a computer, the instructions for causing a function management server that manages a function related to a vehicle and performs data communication with an in-vehicle system which presents a recommend function specified by recommend function information when the in-vehicle system receives the recommend function information distributed from the function management server, to execute:

a comment information acquisition procedure for acquiring comment information of a driver of the vehicle in an online communication service using a website;

a third recommend function specifying procedure for specifying the recommend function based on the comment information of the driver; and an information distribution procedure for distributing the recommend function information related to the recommend function to the in-vehicle system;

wherein:

the recommend function is executable by the in-vehicle system, which is mounted on the vehicle;

software of the recommend function is downloadable from the function management server; and the recommend function includes a plurality of recommend functions that include a lane keeping assist function and a lane tracing assist function.

20. A non-transitory computer readable storage medium comprising instructions for execution by a computer, the instructions for causing an in-vehicle system that performs data communication with a function management server which specifies a recommend function based on at least one of a driving technique of a driver of a vehicle analyzed based on a driving data of the driver of the vehicle, inquiry information of the driver in an automatic conversation service, and comment information of the driver in an online communication service using a website, and distributes recommend function information related to a specified recommend function to the in-vehicle system, to execute:

a recommend function presentation procedure for presenting the recommend function specified by received recommend function information to the driver upon receiving the recommend function information distributed from the function management server;

wherein:

the recommend function is executable by the in-vehicle system, which is mounted on the vehicle;

software of the recommend function is downloadable from the function management server; and the recommend function includes a plurality of recommend functions that include a lane keeping assist function and a lane tracing assist function.

* * * * *